US011914507B2

(12) United States Patent
Kuruma et al.

(10) Patent No.: US 11,914,507 B2
(45) Date of Patent: Feb. 27, 2024

(54) SOFTWARE TEST APPARATUS AND SOFTWARE TEST METHOD

(71) Applicant: Hitachi, Ltd., Tokyo (JP)

(72) Inventors: Hironobu Kuruma, Tokyo (JP); Naoto Sato, Tokyo (JP); Tomoyuki Myojin, Tokyo (JP); Hideto Ogawa, Tokyo (JP); Makoto Ishikawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 134 days.

(21) Appl. No.: 17/825,564

(22) Filed: May 26, 2022

(65) Prior Publication Data

US 2022/0391315 A1 Dec. 8, 2022

(30) Foreign Application Priority Data

Jun. 2, 2021 (JP) ................................ 2021-092693

(51) Int. Cl.
G06F 11/36 (2006.01)
G06N 5/046 (2023.01)
G05B 17/02 (2006.01)

(52) U.S. Cl.
CPC ...... *G06F 11/3688* (2013.01); *G06F 11/3684* (2013.01); *G06N 5/046* (2013.01)

(58) Field of Classification Search
CPC . G06F 11/3684; G06F 11/3688; G06N 5/046; G05B 17/02
See application file for complete search history.

(56) References Cited

U.S. PATENT DOCUMENTS

| 10,545,731 | B1* | 1/2020 | Ciolfi ...................... G06F 30/20 |
| 2009/0178021 | A1* | 7/2009 | Alluri ................. G06F 11/3684 717/104 |
| 2016/0246838 | A1* | 8/2016 | Li .......................... G06F 16/254 |
| 2020/0265342 | A1 | 8/2020 | Sato et al. |

FOREIGN PATENT DOCUMENTS

JP 2020-135171 A 8/2020

OTHER PUBLICATIONS

Ian Wolforth et al. "Generalizable safety annotations for specification of failure patterns", [Online], pp. 453-483, [Retrieved from Internet on Nov. 18, 2023], <https://onlinelibrary.wiley.com/doi/pdf/10.1002/spe.966> (Year: 2010).*

* cited by examiner

*Primary Examiner* — Ziaul A Chowdhury
(74) *Attorney, Agent, or Firm* — Volpe Koenig

(57) ABSTRACT

To make validity of a prediction model created by machine learning be able to be verified with appropriate accuracy and efficiency. A software test apparatus includes a storage device configured to store a prediction model, and an arithmetic device. The arithmetic device is configured to accept inputs of a precondition, a constraint condition, and an approximation threshold value, convert the prediction model into a logical expression, analyze an approximation range based on the approximation threshold value with respect to the logical expression to simplify the logical expression, generate an inspection expression by combining the simplified logical expression with the precondition and negation of the constraint condition, search for, as a counterexample, a value satisfying the inspection expression, input the value to the prediction model to evaluate inspection accuracy when the counterexample exists, and output a result of the evaluation.

14 Claims, 21 Drawing Sheets

FIG. 7A $f0 > 12 \land w1 = 0.8$
$\text{not}(f0 > 12) \land f1 > 0.76 \land w1 = 1.2$
$\text{not}(f0 > 12) \land \text{not}(f1 > 0.76) \land w1 = 0.7$
$f1 < 1.5 \land f0 < 30 \land w2 = 1.4$
$f1 < 1.5 \land \text{not}(f0 < 30) \land w2 = 1.5$
$\text{not}(f1 < 1.5) \land f0 < 30 \land w2 = 0.3$
$\text{not}(f1 < 1.5) \land \text{not}(f0 < 30) \land w2 = 0.5$

FIG. 7B $(f0 > 12 \land w1 = 0.8) \lor (\text{not}(f0 > 12) \land f1 > 0.76 \land w1 = 1.2) \lor$
$(\text{not}(f0 > 12) \land \text{not}(f1 > 0.76) \land w1 = 0.7)$ $(f1 < 1.5 \land f0 < 30 \land w2 = 1.4) \lor (f1 < 1.5 \land \text{not}(f0 < 30) \land w2 = 1.5) \lor$
$(\text{not}(f1 < 1.5) \land f0 < 30 \land w2 = 0.3) \lor (\text{not}(f1 < 1.5) \land \text{not}(f0 < 30) \land w2 = 0.5)$

FIG. 7C $((f0 > 12 \land w1 = 0.8) \lor (\text{not}(f0 > 12) \land f1 > 0.76 \land w1 = 1.2) \lor$
$(\text{not}(f0 > 12) \land \text{not}(f1 > 0.76) \land w1 = 0.7)) \land$
$((f1 < 1.5 \land f0 < 30 \land w2 = 1.4) \lor (f1 < 1.5 \land \text{not}(f0 < 30) \land w2 = 1.5) \lor$
$(\text{not}(f1 < 1.5) \land f0 < 30 \land w2 = 0.3) \lor (\text{not}(f1 < 1.5) \land \text{not}(f0 < 30) \land w2 = 0.5)) \land$
$y = w1 + w2$

*FIG. 12*
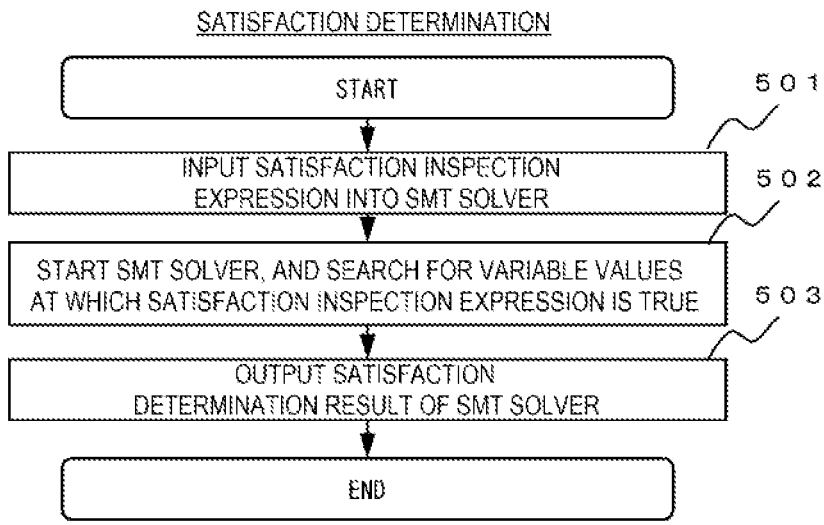
*FIG. 13*
COUNTEREXAMPLE 1:   $f0 = 10 \land f1 = 1 \land w1 = 1.2 \land w2 = 1.4 \land y = 2.6$
COUNTEREXAMPLE 2:   $f0 = 12 \land f1 = 0.6 \land w1 = 0.8 \land w2 = 1.4 \land y = 2.2$
*FIG. 14*
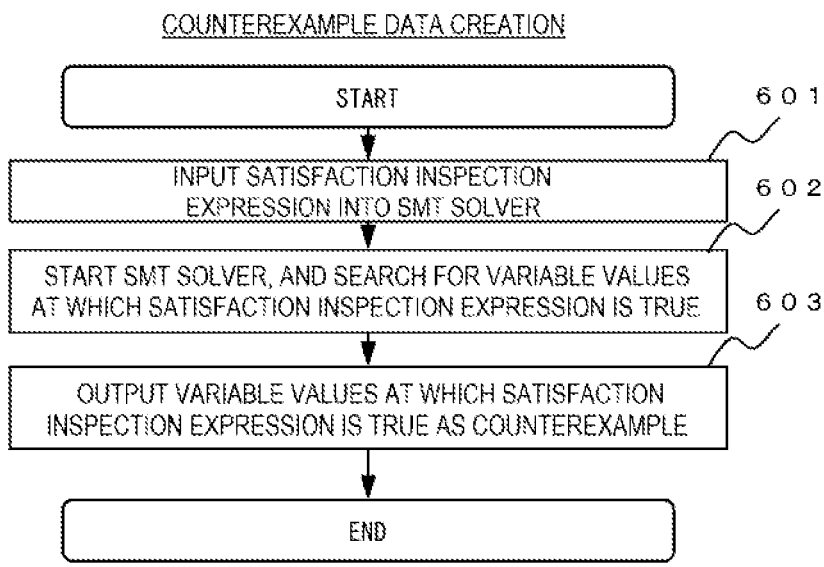

FIG. 15A

IF f0 = 10, f1 = 1 IS INPUT TO PREDICTION MODEL, y = 2.6, WHICH VIOLATES CONSTRAINT CONDITION, AND THUS COUNTEREXAMPLE 1 IS "COUNTEREXAMPLE"   ~1801

FIG. 15B

IF f0 = 12, f1 = 0.6 IS INPUT TO PREDICTION MODEL, y = 2.1, WHICH DOES NOT VIOLATE CONSTRAINT CONDITION, AND THUS COUNTEREXAMPLE 2 IS "FALSE COUNTEREXAMPLE"   ~1802

FIG. 16A

OUTPUT EXAMPLE OF COUNTEREXAMPLE
OUTPUT FROM TEST RESULT OUTPUT UNIT   ~1901 f0 = 10   f1 = 1   w1 = 1.2   w2 = 1.4   y = 2.6

FIG. 16B

OUTPUT EXAMPLE OF SPECIFIED SUB-EXPRESSION SATISFIED BY
COUNTEREXAMPLE AND OUTPUT FROM TEST RESULT OUTPUT UNIT   ~1902 not(f0 > 12) ∧ f1 > 0.76 ∧ w1 = 1.2      f1 < 1.5 ∧ f0 < 30 ∧ w2 = 1.4

FIG. 16C

OUTPUT EXAMPLE OF CONSTRAINT CONDITION RELAXED BASED ON
COUNTEREXAMPLE AND OUTPUT FROM TEST RESULT OUTPUT UNIT $y \leq 2.6$   ~1903

FIG. 19

```
                                                          2001
f0 > 12 ∧ w1 = 0.8
not(f0 > 12) ∧ f1 > 0.76 ∧ w1 = 1.2
not(f0 > 12) ∧ not(f1 > 0.76) ∧ w1 = 0.7
f1 < 1.5 ∧ f0 < 30 ∧ w2 = 1.4
~~f1 < 1.5 ∧ not(f0 < 30) ∧ w2 = 1.5~~  PATH THAT DOES NOT SATISFY PRECONDITION IS DELETED
not(f1 < 1.5) ∧ f0 < 30 ∧ w2 = 0.3
~~not(f1 < 1.5) ∧ not(f0 < 30) ∧ w2 = 0.5~~  PATH THAT DOES NOT SATISFY PRECONDITION IS DELETED
```

FIG. 20

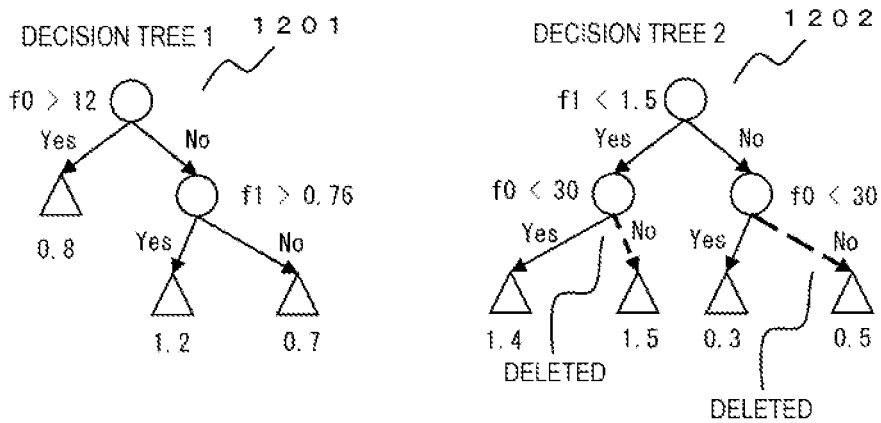

FIG. 21

```
                                                          2101
(0.7 ≤ w1) ∧ (w1 ≤ 1.2) ∧
((f1 < 1.5 ∧ f0 < 30 ∧ w2 = 1.4) ∨ (f1 < 1.5 ∧ not(f0 < 30) ∧ w2 = 1.5) ∨
(not(f1 < 1.5) ∧ f0 < 30 ∧ w2 = 0.3) ∨ (not(f1 < 1.5) ∧ not(f0 < 30) ∧ w2 = 0.5)) ∧
y = w1 + w2
```

FIG. 22

```
                                                          2201
(0.7 ≤ w1) ∧ (w1 ≤ 1.2) ∧
((f1 < 1.5 ∧ not(f0 < 30) ∧ w2 = 1.5) ∨ (f1 < 1.5 ∧ f0 < 30 ∧ w2 = 1.4) ∨
(not(f1 < 1.5) ∧ not(f0 < 30) ∧ w2 = 0.5) ∨ (not(f1 < 1.5) ∧ f0 < 30 ∧ w2 = 0.3)) ∧
y = w1 + w2 ∧
(f0 < 15 ∧ f1 > 0.5) ∧ not(y < 2.2)
```

FIG. 23A

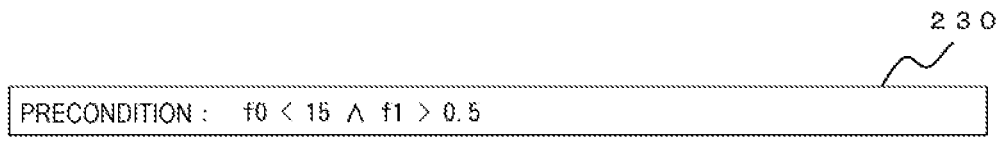

PRECONDITION: $f0 < 15 \land f1 > 0.5$

FIG. 23B

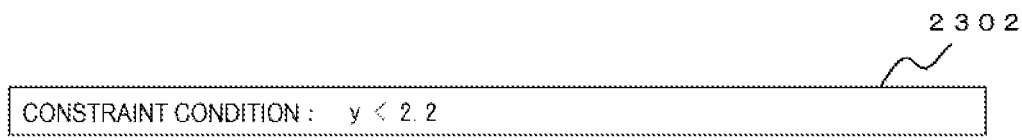

CONSTRAINT CONDITION: $y < 2.2$

FIG. 23C

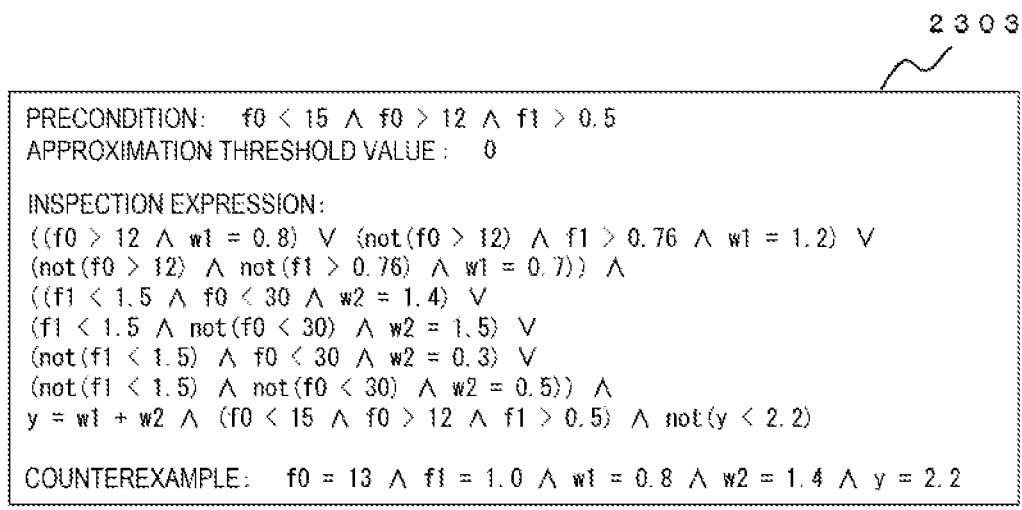

PRECONDITION: $f0 < 15 \land f0 > 12 \land f1 > 0.5$
APPROXIMATION THRESHOLD VALUE: 0

INSPECTION EXPRESSION:
$((f0 > 12 \land w1 = 0.8) \lor (\text{not}(f0 > 12) \land f1 > 0.76 \land w1 = 1.2) \lor$
$(\text{not}(f0 > 12) \land \text{not}(f1 > 0.76) \land w1 = 0.7)) \land$
$((f1 < 1.5 \land f0 < 30 \land w2 = 1.4) \lor$
$(f1 < 1.5 \land \text{not}(f0 < 30) \land w2 = 1.5) \lor$
$(\text{not}(f1 < 1.5) \land f0 < 30 \land w2 = 0.3) \lor$
$(\text{not}(f1 < 1.5) \land \text{not}(f0 < 30) \land w2 = 0.5)) \land$
$y = w1 + w2 \land (f0 < 15 \land f0 > 12 \land f1 > 0.5) \land \text{not}(y < 2.2)$ COUNTEREXAMPLE: $f0 = 13 \land f1 = 1.0 \land w1 = 0.8 \land w2 = 1.4 \land y = 2.2$

FIG. 23D

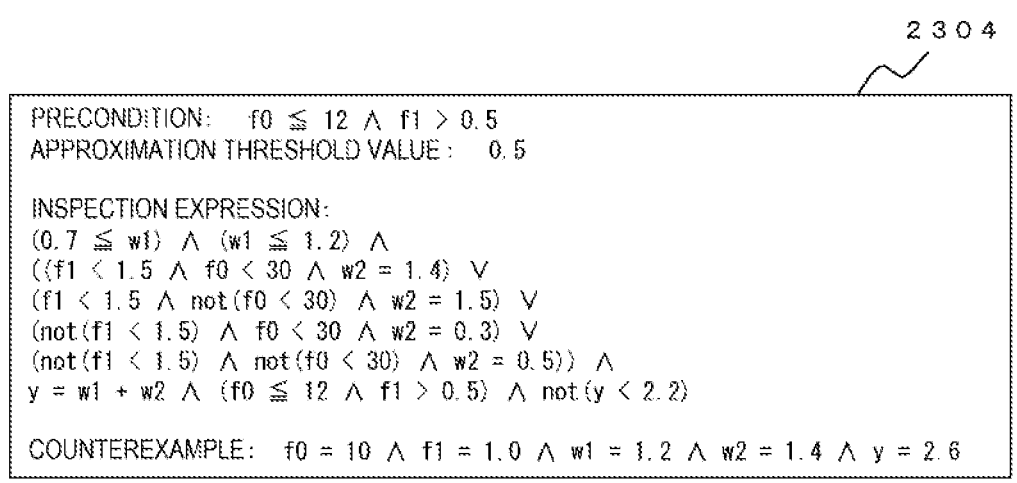

PRECONDITION: $f0 \leq 12 \land f1 > 0.5$
APPROXIMATION THRESHOLD VALUE: 0.5

INSPECTION EXPRESSION:
$(0.7 \leq w1) \land (w1 \leq 1.2) \land$
$((f1 < 1.5 \land f0 < 30 \land w2 = 1.4) \lor$
$(f1 < 1.5 \land \text{not}(f0 < 30) \land w2 = 1.5) \lor$
$(\text{not}(f1 < 1.5) \land f0 < 30 \land w2 = 0.3) \lor$
$(\text{not}(f1 < 1.5) \land \text{not}(f0 < 30) \land w2 = 0.5)) \land$
$y = w1 + w2 \land (f0 \leq 12 \land f1 > 0.5) \land \text{not}(y < 2.2)$ COUNTEREXAMPLE: $f0 = 10 \land f1 = 1.0 \land w1 = 1.2 \land w2 = 1.4 \land y = 2.6$

FIG. 24

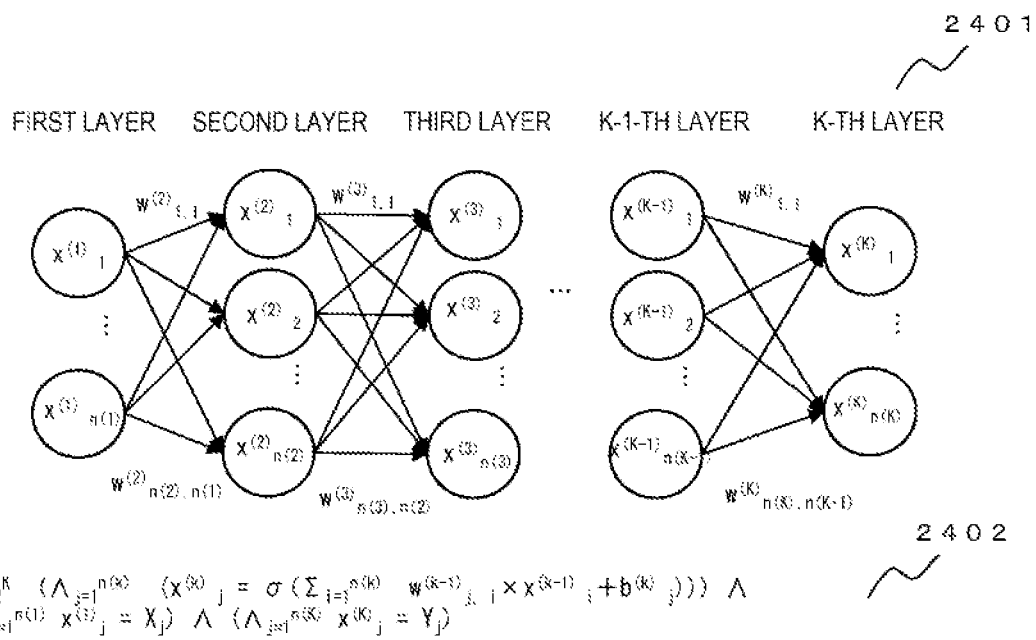

HERE, K REPRESENTS A LAYER NUMBER (FROM 1 TO K) OF A NEURAL NETWORK, n(K) REPRESENTS THE NUMBER OF NODES IN A K-TH LAYER, $X^{(K)}_j$ REPRESENTS AN OUTPUT VALUE OF A J-TH NODE OF THE K-TH LAYER,
$W^{(k-1)}_{i,j}$ REPRESENTS A COMBINING WEIGHT BETWEEN AN i-TH NODE OF A k-1-TH LAYER AND A j-TH NODE OF THE k-TH LAYER,
$b^{(k)}_j$ REPRESENTS A BIAS OF $X^{(k)}_j$, $X_1,...X_{n(1)}$ REPRESENTS INPUT DATA, $Y_1,...Y_{n(K)}$ REPRESENTS OUTPUT DATA, AND $\sigma$ REPRESENTS AN ACTIVATION FUNCTION.

$x^{(1)}_1 = x$
$(s^{(2)}_1 = -0.5 \times x^{(1)}_1 + 1.0) \wedge (s^{(2)}_1 \leq 0 \rightarrow x^{(2)}_1 = 0) \wedge (s^{(2)}_1 > 0 \rightarrow x^{(2)}_1 = s^{(2)}_1)$
$(s^{(2)}_2 = 1.0 \times x^{(1)}_1 + 0.6) \wedge (s^{(2)}_2 \leq 0 \rightarrow x^{(2)}_2 = 0) \wedge (s^{(2)}_2 > 0 \rightarrow x^{(2)}_2 = s^{(2)}_2)$
$(s^{(3)}_1 = 1.5 \times x^{(2)}_1 + 2.0 \times x^{(2)}_2 - 2.0) \wedge (s^{(3)}_1 \leq 0 \rightarrow x^{(3)}_1 = 0) \wedge$
$(s^{(3)}_1 > 0 \rightarrow x^{(3)}_1 = s^{(3)}_1)$

2602

$x^{(1)}_1 = x$ $(s^{(2)}_1 = -0.5 \times x^{(1)}_1 + 1.0) \wedge (s^{(2)}_1 \leq 0 \rightarrow x^{(2)}_1 = 0) \wedge (s^{(2)}_1 > 0 \rightarrow x^{(2)}_1 = s^{(2)}_1) \wedge$
$(s^{(2)}_2 = 1.0 \times x^{(1)}_1 + 0.6) \wedge (s^{(2)}_2 \leq 0 \rightarrow x^{(2)}_2 = 0) \wedge (s^{(2)}_2 > 0 \rightarrow x^{(2)}_2 = s^{(2)}_2)$ $(s^{(3)}_1 = 1.5 \times x^{(2)}_1 + 2.0 \times x^{(2)}_2 - 2.0) \wedge (s^{(3)}_1 \leq 0 \rightarrow x^{(3)}_1 = 0) \wedge$
$(s^{(3)}_1 > 0 \rightarrow x^{(3)}_1 = s^{(3)}_1) \wedge$
$y = x^{(3)}_1$

2603

$x^{(1)}_1 = x \wedge$
$(s^{(2)}_1 = -0.5 \times x^{(1)}_1 + 1.0) \wedge (s^{(2)}_1 \leq 0 \rightarrow x^{(2)}_1 = 0) \wedge (s^{(2)}_1 > 0 \rightarrow x^{(2)}_1 = s^{(2)}_1) \wedge$
$(s^{(2)}_2 = 1.0 \times x^{(1)}_1 + 0.6) \wedge (s^{(2)}_2 \leq 0 \rightarrow x^{(2)}_2 = 0) \wedge (s^{(2)}_2 > 0 \rightarrow x^{(2)}_2 = s^{(2)}_2) \wedge$
$(s^{(3)}_1 = 1.5 \times x^{(2)}_1 + 2.0 \times x^{(2)}_2 - 2.0) \wedge (s^{(3)}_1 \leq 0 \rightarrow x^{(3)}_1 = 0) \wedge$
$(s^{(3)}_1 > 0 \rightarrow x^{(3)}_1 = s^{(3)}_1) \wedge$
$y = x^{(3)}_1$

FIG. 29

$(s^{(2)}_1 = -0.5 \times x^{(1)}_1 + 1.0) \wedge (s^{(2)}_1 \leq 0 \rightarrow x^{(2)}_1 = 0) \wedge (s^{(2)}_1 > 0 \rightarrow x^{(2)}_1 = s^{(2)}_1)$ ~2701

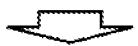

$(s^{(2)}_1 = 0 \times x^{(1)}_1 + 1.0) \wedge (s^{(2)}_1 \leq 0 \rightarrow x^{(2)}_1 = 0) \wedge (s^{(2)}_1 > 0 \rightarrow x^{(2)}_1 = s^{(2)}_1)$ ~2702

~2703

$x^{(1)}_1 = x \wedge$
$(x^{(2)}_1 = 1.0) \wedge$
$(s^{(2)}_2 = 1.0 \times x^{(1)}_1 + 0.6) \wedge (s^{(2)}_2 \leq 0 \rightarrow x^{(2)}_2 = 0) \wedge (s^{(2)}_2 > 0 \rightarrow x^{(2)}_2 = s^{(2)}_2) \wedge$
$(s^{(3)}_1 = 1.5 \times x^{(2)}_1 + 2.0 \times x^{(2)}_2 - 2.0) \wedge (s^{(3)}_1 \leq 0 \rightarrow x^{(3)}_1 = 0) \wedge$
$(s^{(3)}_1 > 0 \rightarrow x^{(3)}_1 = s^{(3)}_1) \wedge$
$y = x^{(3)}_1$

$x^{(1)}_1 = x \wedge$
$(x^{(2)}_1 = 1.0) \wedge$
$(s^{(2)}_2 = 1.0 \times x^{(1)}_1 + 0.6) \wedge (s^{(2)}_2 \leq 0 \rightarrow x^{(2)}_2 = 0) \wedge (s^{(2)}_2 > 0 \rightarrow x^{(2)}_2 = s^{(2)}_2) \wedge$
$(s^{(3)}_1 = 1.5 \times x^{(2)}_1 + 2.0 \times x^{(2)}_2 - 2.0) \wedge (s^{(3)}_1 \leq 0 \rightarrow x^{(3)}_1 = 0) \wedge$
$(s^{(3)}_1 > 0 \rightarrow x^{(3)}_1 = s^{(3)}_1) \wedge$
$y = x^{(3)}_1$
$\wedge$
$(x < 15 \wedge x > 0.5) \wedge \text{not}(y < 2.2)$

| COUNTEREXAMPLE 1: $x = 2 \wedge x^{(1)}_1 = x \wedge x^{(2)}_1 = 1.0 \wedge x^{(2)}_2 = 2.6 \wedge x^{(3)}_1 = 4.7 \wedge y = 4.7$ |

~2902

| COUNTEREXAMPLE 2: $x = 1 \wedge x^{(1)}_1 = x \wedge x^{(2)}_1 = 1.0 \wedge x^{(2)}_2 = 1.6 \wedge x^{(3)}_1 = 2.7 \wedge y = 2.7$ |

SOFTWARE TEST APPARATUS AND SOFTWARE TEST METHOD

CROSS-REFERENCE TO RELATED APPLICATION

This application claims priority pursuant to Japanese patent application No. 2021-092693, filed on Jun. 2, 2021, the entire disclosure of which is incorporated herein by reference.

BACKGROUND

Technical Field

The present invention relates to a software test apparatus and a software test method.

Related Art

There is an artificial intelligence software in which machine learning is incorporated. The artificial intelligence software uses a learned model that is mechanically created based on learning data, and thus can implement an advanced function that cannot be created by humans. Meanwhile, there is a possibility that processing that is unexpected for humans is performed.

Therefore, for example, as a related art for verifying such a learned model, a machine learning program verification apparatus (see JP-A-2020-135171) that can comprehensively evaluate validity of a prediction model has been proposed.

The apparatus includes a storage device and an arithmetic device. The storage device stores a program that is created by machine learning, and that outputs a value of a response variable with a value of an explanatory variable as an input in accordance with a prediction algorithm based on an ensemble tree including a plurality of decision trees. The arithmetic device is configured to execute: processing of creating a decision tree logical expression by combining, by logical product, path logical expressions indicating decision tree paths of the decision trees for the program; processing of creating a combined logical expression for the decision tree logical expression by combining, by logical product, a verification property logical expression and a response variable calculation logical expression, the verification property logical expression indicating a verification property to be verified for the program, and the response variable calculation logical expression defining a relation between a decision tree output value of each decision tree and the value of the response variable; processing of obtaining a satisfiability determination result of the combined logical expression by inputting the combined logical expression to a predetermined satisfiability solver, and determining, based on the satisfiability determination result, whether the program satisfies the verification property; and processing of, when a result of the determination indicates satisfaction, obtaining, from a satisfaction solution indicated by the satisfiability solver, a violation input value that is a value of an explanatory variable that violates the verification property and a violation output value that is a value of a response variable corresponding to the violation input value.

According to the related art, validity of a prediction model (a learned model. Hereinafter, referred to as a prediction model) can be verified. Meanwhile, a length of a converted logical expression to be inspected exponentially increases with respect to the number of decision trees of the prediction model. Therefore, depending on the prediction model, a calculation amount required for satisfiability determination increases explosively, and it is highly possible that it will be actually difficult to perform the verification with appropriate accuracy.

SUMMARY

An object of the invention is to provide a technique capable of verifying, with appropriate accuracy and efficiency, the validity of the prediction model created by machine learning.

A software test apparatus according to the invention for solving the above problems includes: a storage device configured to store a prediction model generated by machine learning, the prediction model being a test target; and an arithmetic device. The arithmetic device is configured to execute: processing of accepting an input of a precondition for determining a range of a test input value; processing of accepting an input of a constraint condition for an inference output value of a prediction model with respect to the test input value; processing of accepting an input of an approximation threshold value; processing of acquiring the prediction model from the storage device and converting the prediction model into a logical expression; processing of analyzing an approximation range based on the approximation threshold value with respect to the logical expression to simplify the logical expression; processing of generating an inspection expression by combining the simplified logical expression with the precondition and negation of the constraint condition; processing of searching for, as a counterexample, a value satisfying the inspection expression; processing of inputting the value to the prediction model to evaluate inspection accuracy when the counterexample exists; and processing of outputting a result of the evaluation.

A software test method according to the invention is a method to be executed by an information processing device, the method including: processing of storing, in a storage device, a prediction model generated by machine learning, the prediction model being a test target; processing of accepting an input of a precondition for determining a range of a test input value; processing of accepting an input of a constraint condition of an inference output value of a prediction model with respect to the test input value; processing of accepting an input of an approximation threshold value; processing of acquiring the prediction model from the storage device and converting the prediction model into a logical expression; processing of analyzing an approximation range based on the approximation threshold value with respect to the logical expression to simplify the logical expression; processing of generating an inspection expression by combining the simplified logical expression with the precondition and negation of the constraint condition; processing of searching for, as a counterexample, a value satisfying the inspection expression; processing of inputting the value to the prediction model to evaluate inspection accuracy when the counterexample exists; and processing of outputting a result of the evaluation.

According to the invention, validity of the prediction model created by machine learning can be verified with appropriate accuracy and efficiency.

BRIEF DESCRIPTION OF THE DRAWINGS

FIG. 7A is a diagram illustrating an example of a process of generating a logical expression according to the first example.

FIG. 7B is a diagram illustrating an example of a process of generating a logical expression according to the first example.

FIG. 7C is a diagram illustrating an example of a process of generating a logical expression according to the first example.

FIG. 1.1 is a diagram illustrating an example of a satisfaction inspection expression according to the first example.

FIG. 12 is a flowchart illustrating a flow example of satisfaction determination processing according to the present embodiment.

FIG. 13 is a diagram illustrating examples of counterexample data according to the first example.

FIG. 14 is a flowchart illustrating a flow example of counterexample data creation processing according to the present embodiment.

FIG. 15A is a diagram illustrating an example of authenticity determination of a counterexample according to the first example.

FIG. 15B is a diagram illustrating another example of the authenticity determination of the counterexample according to the first example.

FIG. 16A is a diagram illustrating an output example of a test result according to the first example.

FIG. 16B is a diagram illustrating another output example of a test result according to the first example.

FIG. 16C is a diagram illustrating another output example of a test result according to the first example.

FIG. 1.8 is a flowchart illustrating a flow example of the software test method according to the present embodiment.

FIG. 19 is a diagram illustrating an example of a logical expression in which paths are deleted according to the first example.

FIG. 20 is a diagram illustrating examples of decision trees in which paths are deleted according to the first example.

FIG. 21 is a diagram illustrating an example of a logical expression of a prediction model according to the first example.

FIG. 22 is a diagram illustrating an example of a satisfaction inspection expression in which logical expressions of paths are arranged according to the first example.

FIG. 23A is a diagram illustrating an example of a precondition in a test performed by giving different approximation threshold values for test input value ranges according to the first example.

FIG. 23B is a diagram illustrating an example of a constraint condition in the test performed by giving different approximation threshold values for test input value ranges according to the first example.

FIG. 23C is a diagram illustrating an example of the test performed by giving different approximation threshold values for test input value ranges according to the first example.

FIG. 23D is a diagram illustrating another example of the test performed by giving different approximation threshold values for test input value ranges according to the first example.

FIG. 24 is a diagram illustrating an example of a K-layer neural network according to a second example.

FIG. 27 is a diagram illustrating an example of a process of generating a logical expression according to the second example.

FIG. 29 is a diagram illustrating an example of an analysis process of an approximation range according to the second example.

FIG. 30 is a diagram illustrating an example of a satisfaction inspection expression according to the second example.

FIG. 31 is a diagram illustrating examples of counterexample data according to the second example.

DETAILED DESCRIPTION OF THE EMBODIMENTS

<Functional Configuration>

Figure 1:
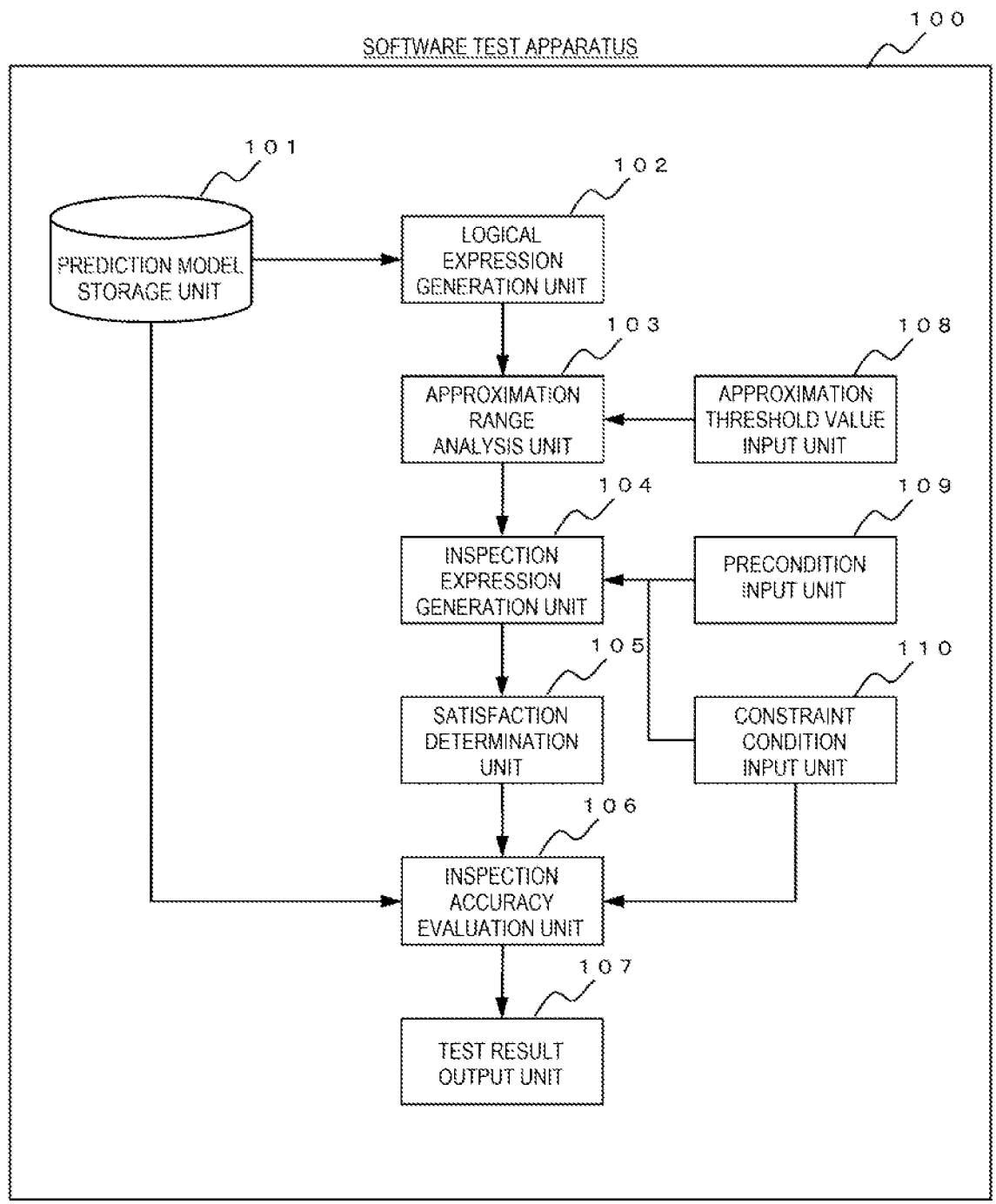
FIG. 1 is a diagram illustrating a functional configuration example of a software test apparatus according to an embodiment.

Hereinafter, embodiments of the invention will be described in detail with reference to the drawings. FIG. 1 is a diagram illustrating a functional configuration example of a software test apparatus 100 according to an embodiment. The software test apparatus 100 illustrated in FIG. 1 is a computer capable of verifying, with appropriate accuracy and efficiency, validity of a prediction model created by machine learning. As a specific application target of the software test apparatus 100, for example, verification of a prediction model used for improving productivity in a factory or optimizing vehicle allocation can be assumed.

As illustrated in FIG. 1, the software test apparatus 100 according to the present embodiment includes a prediction model storage unit 101, a logical expression generation unit 102, an approximation range analysis unit 103, an inspection expression generation unit 104, a satisfaction determination unit 105, an inspection accuracy evaluation unit 106, a test result output unit 107, an approximation threshold value input unit 108, a precondition input unit 109, and a constraint condition input unit 110.

Among these units, the prediction model storage unit 101 stores a learned prediction model to be tested. The prediction model storage unit 101 is implemented with a storage device to be described later.

The logical expression generation unit 102 generates a logical expression that expresses a function of the prediction model. The logical expression generation unit 102 is implemented by an arithmetic device, which will be described later, executing a program.

The approximation range analysis unit 103 inputs an approximation threshold value of the time when the prediction model is tested. The approximation range analysis unit 103 is implemented by the above arithmetic device executing a program.

The inspection expression generation unit 104 generates an inspection expression in which a logical expression obtained by replacing a sub-expression of an approximation target with an approximate value is combined with a precondition and negation of a constraint condition. The inspection expression generation unit 104 is implemented by the above arithmetic device executing a program.

The satisfaction determination unit 105 determines presence or absence of input/output data satisfying the inspection expression. The satisfaction determination unit 105 is implemented by the above arithmetic device executing a program.

The inspection accuracy evaluation unit 106 determines that the prediction model does not violate the constraint condition or that inspection accuracy is insufficient, when there is no input/output data satisfying the inspection expression. When there is input/output data satisfying the inspection expression, the input data is given to the prediction model to acquire the output data, and if the output data violates the constraint condition, the input data is determined to be a counterexample, and if the output data does not violate the constraint condition, the input data is determined to be a false counterexample. The inspection accuracy evaluation unit 106 is implemented by the above arithmetic device executing a program.

The test result output unit 107 outputs an evaluation result obtained by the above inspection accuracy evaluation unit 106 to an appropriate output device. The test result output unit 107 is implemented by the above arithmetic device executing a program.

The approximation threshold value input unit 108 accepts an input of the approximation threshold value of the time when the prediction model is tested. The approximation threshold value input unit 108 is implemented by the above arithmetic device executing a program.

The precondition input unit 109 accepts an input of the precondition specifying a range of the input data for testing the prediction model. The precondition input unit 109 is implemented by the above arithmetic device executing a program.

The constraint condition input unit 110 accepts an input of the constraint condition specifying a condition to be satisfied by inference output data of the prediction model. The constraint condition input unit 110 is implemented by the above arithmetic device executing a program.

<Hardware Configuration>

Figure 2:
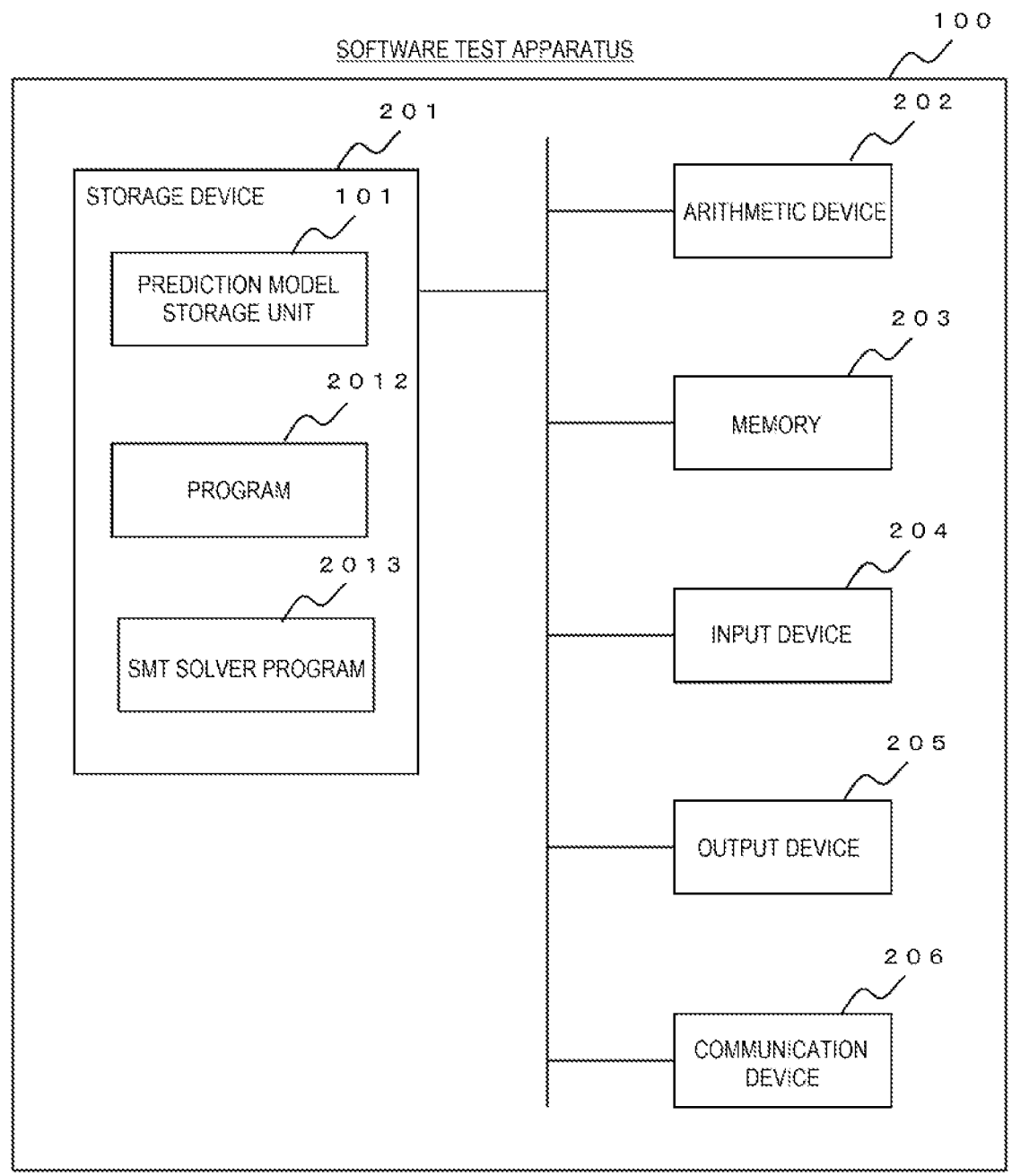
FIG. 2 is a diagram illustrating a hardware configuration example of the software test apparatus according to the present embodiment.

A hardware configuration of the software test apparatus 100 according to the present embodiment is as illustrated in FIG. 2 below.

That is, the software test apparatus 100 includes a storage device 201, an arithmetic device 202, a memory 203, an input device 204, an output device 205, and a communication device 206.

The storage device 201 includes an appropriate nonvolatile storage element such as a solid state drive (SSD) or a hard disk drive.

The arithmetic device 202 is a CPU that executes a program 2012 stored in the storage device 201 by, for example, reading the program 2012 into the memory 203, performs an overall control of the apparatus itself, and performs various determinations, arithmetic operations, and control processing.

The memory 203 includes a volatile storage element such as a random access memory (RAM).

The input device 204 is assumed to be a device such as a keyboard, a mouse, or a microphone that receives a key input or a voice input from a user.

The output device 205 is assumed to be a device such as a display that displays processing data in the arithmetic device 202.

The communication device 206 is assumed to be a network interface card or the like that is connected to an appropriate network and is responsible for communication processing with other devices (a user terminal that distributes a prediction model, an appropriate server device, or the like).

When the software test apparatus 100 is a stand-alone machine, it is preferable to further include the input device for receiving the key input and the voice input from the user, and the output device such as a display for displaying the processing data.

In the storage device 201, in addition to the program 2012 for implementing functions required for the software test apparatus 100 according to the present embodiment, at least the prediction model storage unit 101 already mentioned and an SMT solver program 2013 are stored. The SMT solver program 2013 is used in the satisfaction determination unit 105 to search for a variable value (a counterexample) that satisfies the inspection expression.

<Flow Example: Main Flow>

Hereinafter, an actual procedure of a software test method according to the present embodiment will be described with reference to a drawing. Various operations corresponding to the software test method to be described below are implemented by programs that are read into the memory or the like and executed by the software test apparatus 100. The programs include codes for performing the various operations to be described below.

Figure 3:
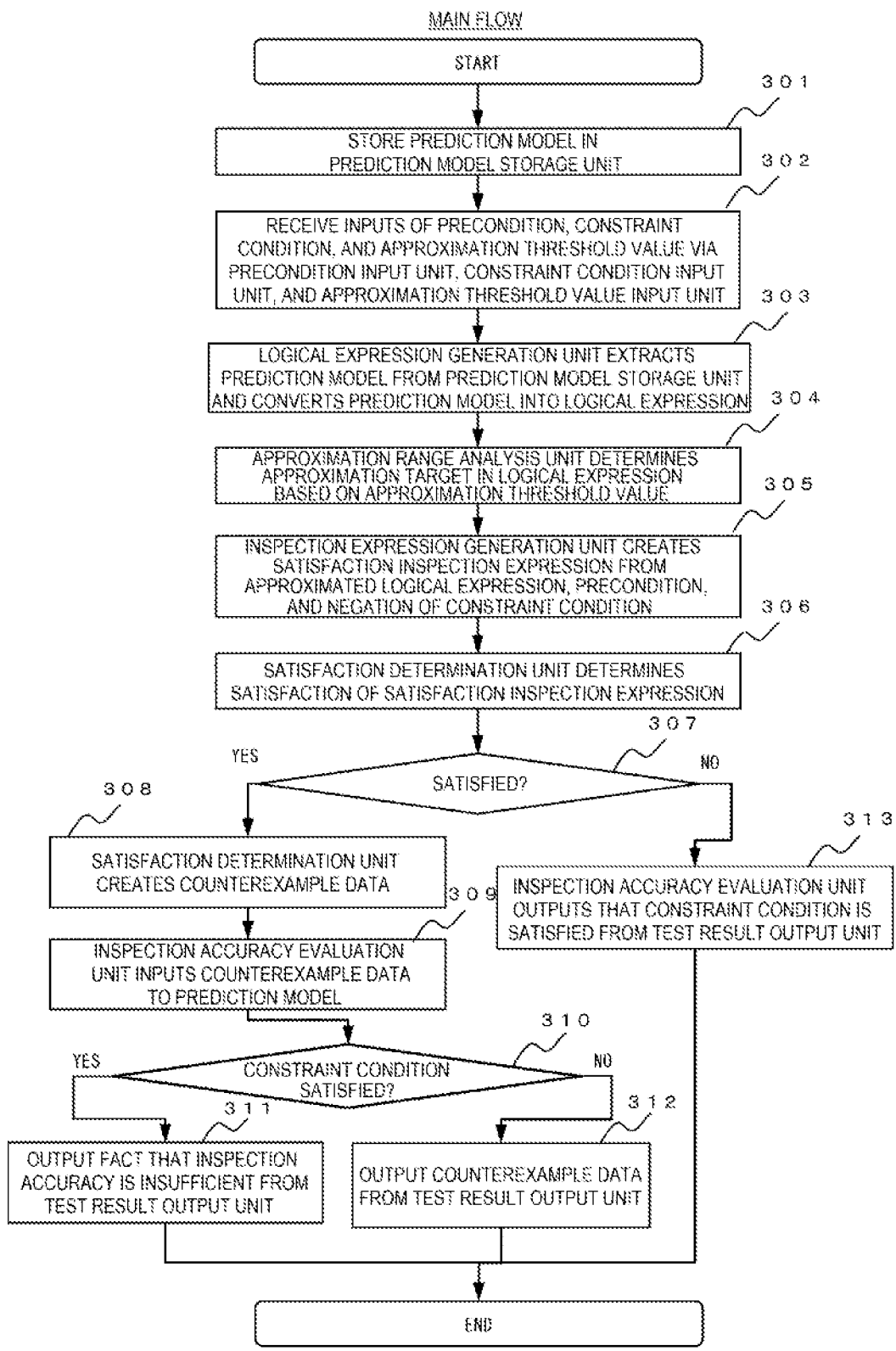
FIG. 3 is a flowchart illustrating an example of a main flow of a software test method according to the present embodiment.

FIG. 3 is a flowchart illustrating an example of a main flow of the software test method according to the present embodiment. In this case, the software test apparatus 100 acquires a prediction model to be tested from an external device via, for example, the input device 204 or the communication device 206, and stores the prediction model in the prediction model storage unit 101 (S301).

Figure 4:
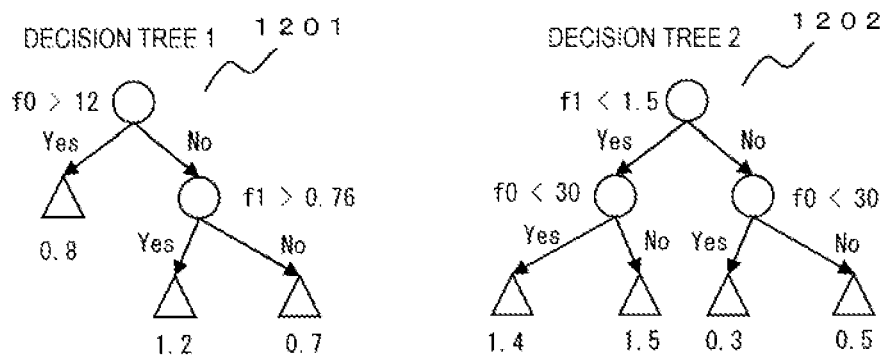
FIG. 4 is a diagram illustrating an example of a decision tree ensemble model according to a first example.

Here, as an example of the prediction model, a decision tree ensemble model is illustrated in FIG. 4. As illustrated in FIG. 4, the decision tree ensemble model has a structure in which paths are formed from root nodes (circle nodes at the top of the figure), which are starting points, to leaf nodes at end points (leaf nodes that are triangle nodes in the figure), branching at each node (circle nodes in the figure) via edges (arrow lines segment in the figure). A weight is associated with each leaf node, and an output variable (a final decision value) is determined by, for example, summing up weight values of the leaf nodes selected in each decision tree.

The software test apparatus 100 acquires each piece of information of a precondition, a constraint condition, and an approximation threshold value via the precondition input unit 109, the constraint condition input unit 110, and the approximation threshold value input unit 108 (S302), and stores the information in an appropriate storage unit such as the memory 203.

As an example of the precondition, a logical expression including an input variable is assumed, as an example of the constraint condition, a logical expression including an output variable is assumed, and as an example of the approximation threshold value, a difference between a maximum value and a minimum value of weights in a decision tree of an approximation target is assumed.

Figure 5:
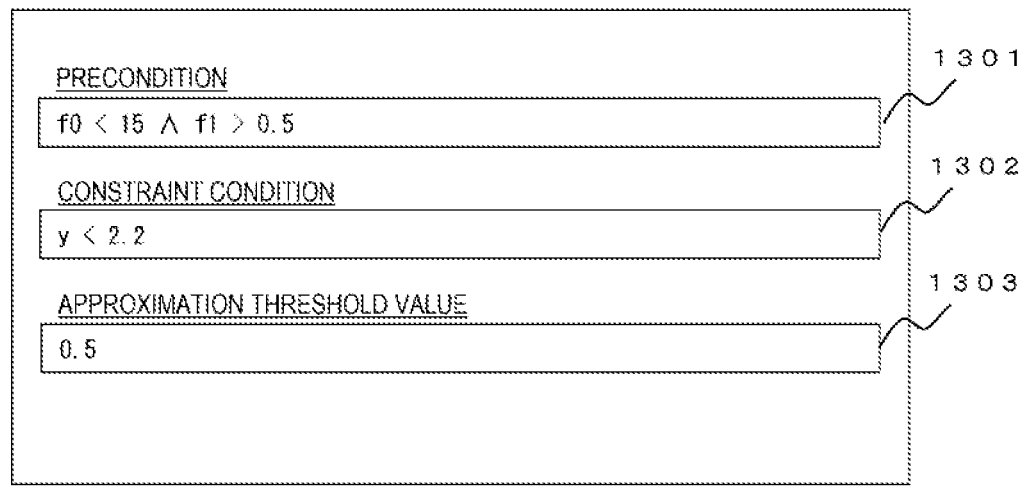
FIG. 5 is a diagram illustrating examples of a precondition, a constraint condition, and an approximation threshold value according to the first example.

FIG. 5 illustrates an example of a screen including input interfaces 1301 to 1303 for each piece of information of the precondition, the constraint condition, and the approximation threshold value. The precondition input unit 109 outputs the screen to the output device 205, and acquires each value input by an operation on the input device 204 in the precondition field 1301, the constraint condition field 1302, and the approximation threshold value field 1303 of the screen.

Subsequently, the logical expression generation unit 102 of the software test apparatus 100 extracts the prediction model from the prediction model storage unit 101 and converts the prediction model into a logical expression (S303). Details of a processing flow related to the conversion into the logical expression will be described later with reference to FIGS. 6, 7A, 7B and 7C.

The approximation range analysis unit 103 of the software test apparatus 100 determines an approximation target in the logical expression obtained in S303 based on the approximation threshold value obtained in the above S302, and approximates the approximation target by a constant (for example, a maximum value and a minimum value of weights in the logical expression including the determined approximation target) (S304). Details of a processing flow related to the approximation processing will be described later with reference to FIGS. 8 and 9.

Subsequently, the inspection expression generation unit 104 of the software test apparatus 100 creates a satisfaction inspection expression based on the logical expression approximated in S304, the above precondition, and negation of the above constraint condition (S305). Details of a processing flow related to the creation of the satisfaction inspection expression will be described later with reference to FIGS. 10 and 11.

The satisfaction determination unit 105 of the software test apparatus 100 determines satisfaction of the satisfaction inspection expression (S306). Details of a processing flow related to the satisfaction determination will be described later with reference to FIGS. 12 and 13.

When it is determined, as a result of the above determination, that the satisfaction inspection expression is not satisfied (S307: NO), the test result output unit 107 of the software test apparatus 100 outputs a fact that the above constraint condition is satisfied from the output device 205 or the communication device 206 (S310), and ends the processing.

On the other hand, when it is determined that the satisfaction inspection expression is satisfied as a result of the above determination (S307: YES), the satisfaction determination unit 105 of the software test apparatus 100 creates counterexample data (S308).

Subsequently, the inspection accuracy evaluation unit 106 of the software test apparatus 100 inputs the counterexample data created in S308 to the prediction model (S309). Details of a processing flow of the inspection accuracy evaluation unit 106 will be described later with reference to FIG. 14.

When an output result of the prediction model satisfies the constraint condition, that is, when the input counterexample is a false counterexample as a result of the above input (S310: YES), the test result output unit 107 of the software test apparatus 100 outputs a fact that the inspection accuracy is insufficient (an output 1802 in FIG. 15B) from the output device 205 (S311), and ends the processing.

On the other hand, when the output result of the prediction model does not satisfy the constraint condition, that is, when the input counterexample is a true counterexample as a result of the above input (S310: NO), the test result output unit 107 of the software test apparatus 100 outputs the counterexample data (an output 1801 in FIG. 15A) from the output device 205 (S312), and ends the processing.

<Flow Example: Creation of Logical Expression>

Figure 6:
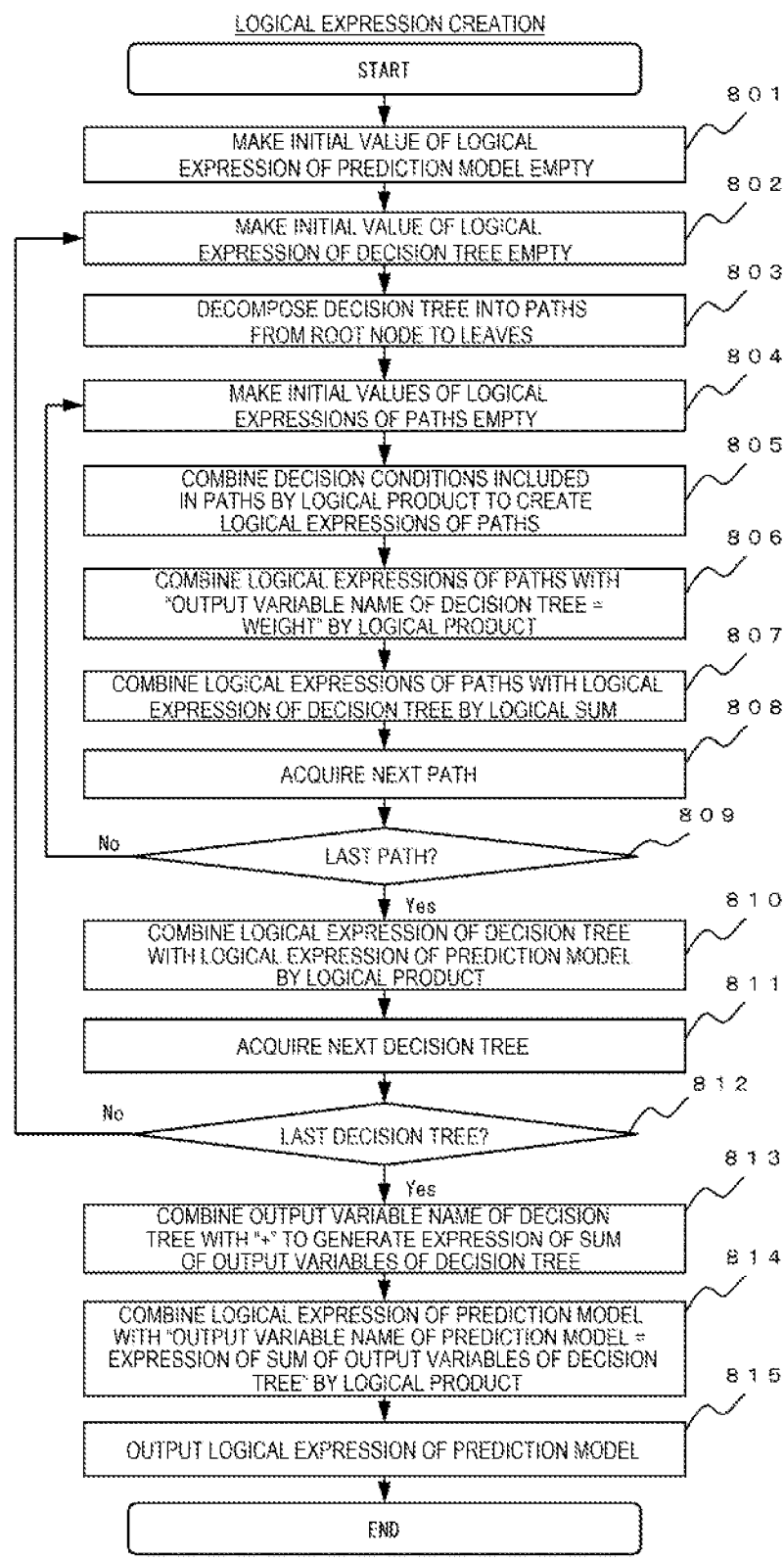
FIG. 6 is a flowchart illustrating a flow example of logical expression generation processing according to the present embodiment.

Subsequently, the details of the processing (S303) in the logical expression generation unit 102 will be described with reference to the flow of FIG. 6. In this case, the logical expression generation unit 102 makes an initial value of the logical expression of the prediction model empty (S801).

Subsequently, the logical expression generation unit 102 makes an initial value of a logical expression of a decision tree empty (S802).

The logical expression generation unit 102 decomposes the decision tree to be processed into paths from the root node to leaves (S803). For the decomposition processing, a technique in the related art shall be appropriately used.

Subsequently, the logical expression generation unit 102 makes initial values of logical expressions of the paths empty (S804).

The logical expression generation unit 102 combines decision conditions included in the paths by logical product to create logical expressions of the paths (S805).

Subsequently, the logical expression generation unit 102 combines "output variable name of decision tree=weight" into the logical expressions of the paths by logical product (S806). Examples of the logical expressions obtained in the above S805 and S806 are illustrated in FIG. 7A.

The logical expression generation unit 102 combines the logical expressions of the paths into the logical expression of the decision tree by logical sum (S807). Examples of the logical expressions obtained in S807 are illustrated in FIG. 7B.

Subsequently, the logical expression generation unit 102 acquires one unprocessed path from the paths decomposed in S803 (S808), and determines whether the unprocessed path is a last unprocessed path in the decision tree (S809).

When another unprocessed path still remains, that is, when the acquired unprocessed path is not the last path as a result of the above determination (S809: No), the logical expression generation unit 102 returns the processing to S804.

On the other hand, when there is no unprocessed path remaining, that is, when the acquired unprocessed path is the last path as a result of the above determination (S809: Yes), the logical expression generation unit 102 combines the logical expression of the decision tree with the logical expression of the prediction model by logical product (S810).

The logical expression generation unit 102 acquires an unprocessed decision tree from the decision tree ensemble model as a next decision tree to be processed (S811), and determines whether the acquired unprocessed decision tree is a last unprocessed decision tree in the decision tree ensemble model (S812).

When another unprocessed decision tree still remains, that is, when the acquired unprocessed decision tree is not the last decision tree as a result of the above determination (S812: No), the logical expression generation unit 102 returns the processing to S802.

On the other hand, when there is no unprocessed decision tree remaining, that is, when the acquired unprocessed decision tree is the last decision tree as a result of the above determination (S812: Yes), the logical expression generation unit 102 combines output variable names of the decision tree with "+" to generate an expression of a sum of the output variables of the decision tree (S813).

Subsequently, the logical expression generation unit 102 combines the logical expression of the prediction model with "output variable name of prediction model=expression of sum of output variables of decision tree" by logical product to generate the logical expression of the prediction model (S814). An example of the logical expression generated through the above S810, S813, and S814 is illustrated in FIG. 7C.

The logical expression generation unit 102 outputs the logical expression obtained in S814 to the approximation range analysis unit 103 (S815), and ends the processing.

<Flow Example: Logical Expression Approximation Processing>

Figure 8:
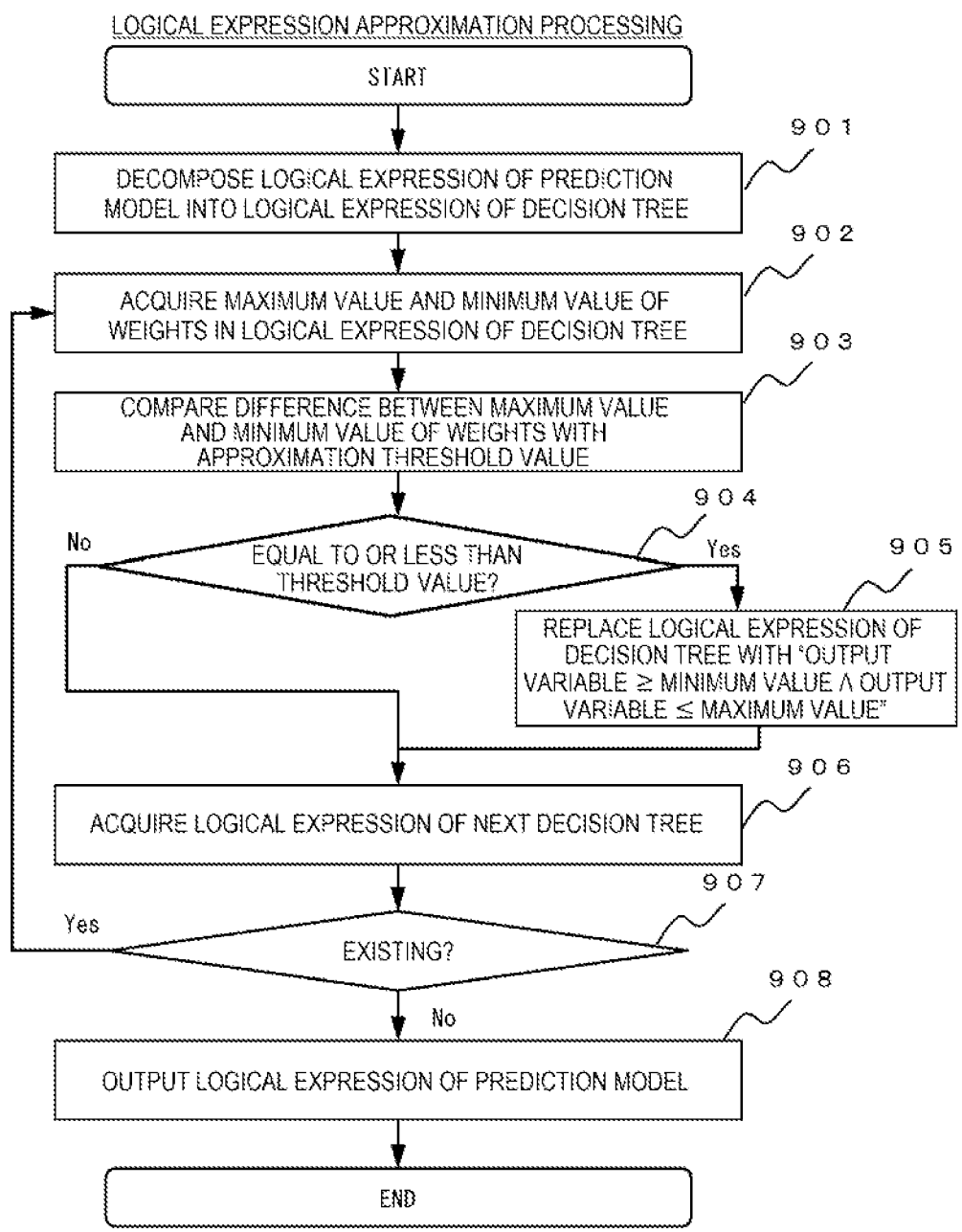
FIG. 8 is a flowchart illustrating a flow example of logical expression approximation processing according to the present embodiment.

Subsequently, detailed processing of the processing (S304) in the approximation range analysis unit 103 will be described. FIG. 8 is a flowchart illustrating a flow example of logical expression approximation processing according to the present embodiment.

In this case, the approximation range analysis unit 103 decomposes the logical expression of the prediction model into the logical expression of the decision tree (S901).

Subsequently, the approximation range analysis unit 103 acquires the maximum value and the minimum value (a maximum value and a minimum value indicated by 1502 in FIG. 9) of weights in the logical expression of the decision tree (S902).

The approximation range analysis unit 103 compares the difference between the maximum value and the minimum value of the weights with the approximation threshold value (S903). That is, the logical expression of the decision tree (a logical expression 1501 in FIG. 9) in which the difference between the maximum value and the minimum value of the weights is equal to or less than the approximation threshold value is extracted.

Figure 9:
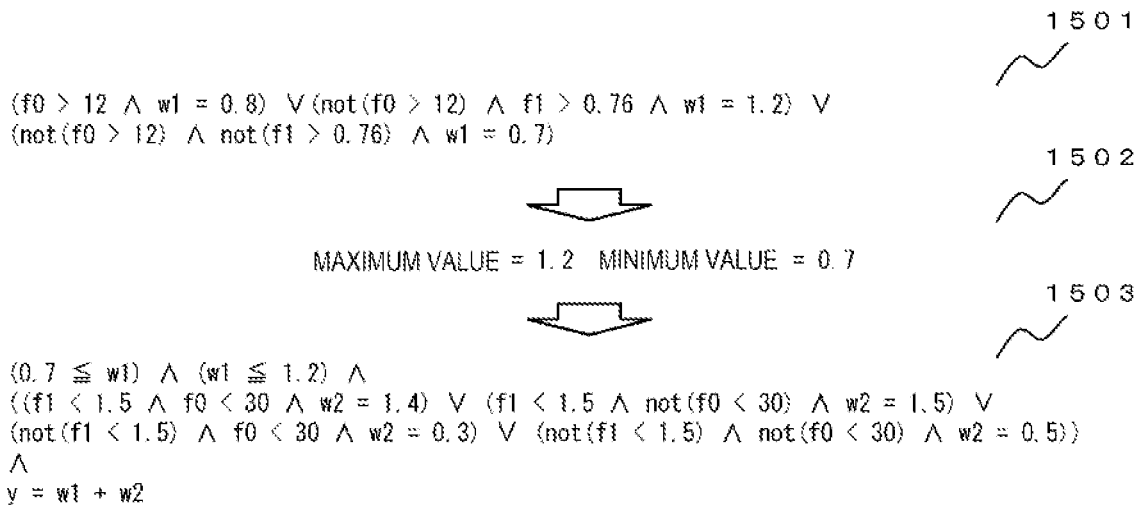
FIG. 9 is a diagram illustrating an example of an analysis process of an approximation range according to the first example.

When the difference is determined to be equal to or less than the threshold value as a result of the above comparison (S904: Yes), the approximation range analysis unit 103 replaces the logical expression of the decision tree with "output variable≥minimum value ∧output variable≤maximum value" (S905). A logical expression 1503 obtained by the replacement is illustrated in FIG. 9.

On the other hand, when the difference is determined to be not equal to or less than the threshold value as a result of the above comparison (S904: No), the approximation range analysis unit 103 acquires a logical expression of a next decision tree (S906), and determines whether there is another unprocessed decision tree (S907).

When it is determined that there is an unprocessed decision tree as a result of the above determination (S907: Yes), the approximation range analysis unit 103 returns the processing to S902.

On the other hand, when it is determined that there is no unprocessed decision tree as a result of the above determination (S907: No), the approximation range analysis unit 103 outputs the logical expression of the prediction model, whose approximation processing is ended by the processing up to here, to the inspection expression generation unit 104 (S908), and ends the processing.

<Flow Example: Satisfaction Inspection Expression Generation>

Figure 10:
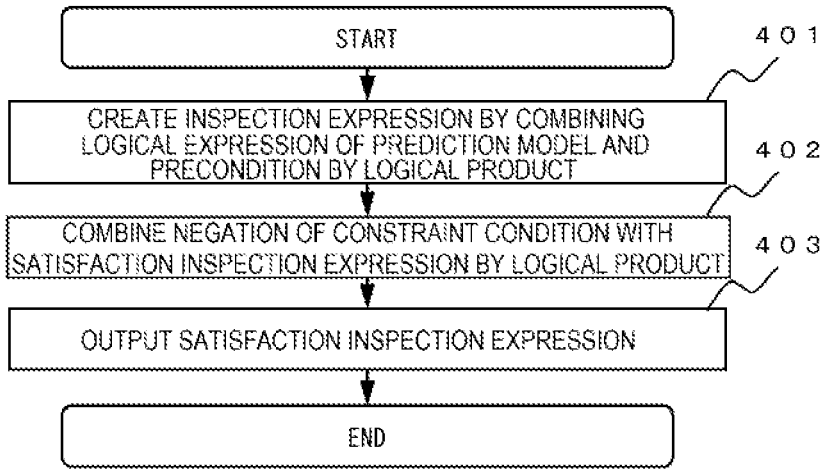
FIG. 10 is a flowchart illustrating a flow example of satisfaction inspection expression generation processing according to the present embodiment.

Subsequently, a detailed flow of inspection expression generation (S305) in the inspection expression generation unit 104 will be described. FIG. 10 is a flowchart illustrating an example of a generation flow of satisfaction inspection expression according to the present embodiment.

In this case, the inspection expression generation unit 104 creates an inspection expression by combining the logical expression of the prediction model and the precondition by logical product (S401).

Figure 11:

The inspection expression generation unit 104 combines the negation of the constraint condition with the satisfaction inspection expression by logical product (S402). A logical expression 1601 obtained by the combination is illustrated in FIG. 11.

Subsequently, the inspection expression generation unit 104 outputs the satisfaction inspection expression obtained in S402 to the satisfaction determination unit 105 (S403), and ends the processing.

<Flow Example: Satisfaction Determination>

Subsequently, a detailed flow of satisfaction determination processing (S306) in the satisfaction determination unit 105 will be described. FIG. 12 is a flowchart illustrating a flow example of the satisfaction determination processing according to the present embodiment.

In this case, the satisfaction determination unit 105 inputs the satisfaction inspection expression into the SMT solver program 2013 (S501), starts the SMT solver program 2013, and searches for variable values at which the satisfaction inspection expression is true (S502). The variable values are counterexamples (counterexamples 1701 and 1702 in FIG. 13).

The satisfaction determination unit 105 outputs a satisfaction determination result to the inspection accuracy evaluation unit 106 (S503), and ends the processing.

<Flow Example: Inspection Accuracy Evaluation>

Subsequently, a detailed flow of inspection accuracy evaluation processing (S308, S309) in the inspection accuracy evaluation unit 106 will be described. FIG. 14 is a flowchart illustrating a flow example of inspection accuracy evaluation processing according to the present embodiment, and specifically illustrates a flow in which, when the counterexample exists, the counterexample is input to the prediction model and is confirmed as a true counterexample.

When the satisfaction determination result is "satisfied" (S307: Yes), the inspection accuracy evaluation unit 106 inputs the satisfaction inspection expression into the SMT solver program 2013 by the satisfaction determination unit 105 (S601), starts the SMT solver program 2013, and searches for variable values at which the satisfaction inspection expression is true (S602). The variable values at which the satisfaction inspection expression is true are output to the prediction model as the counterexample data (S603), the output data of the prediction model using the counterexample data as input data is obtained (S309), and whether the output data satisfies the constraint condition is inspected (S310). If the output data satisfies the constraint condition (S310: Yes), the counterexample data is determined to be a false counterexample. On the other hand, if the output data does not satisfy the constraint condition (S310: No), that is, if the counterexample data is a true counterexample, it is determined that the prediction model violates the constraint condition.

For example, the counterexample 1 obtained based on the precondition (1301), the constraint condition (1302), and the approximation threshold value (1303) of FIG. 5 for the prediction models (1201, 1202) of FIG. 4 is a true counterexample since in an original prediction model, w1=1.2 and w2=1.4, resulting in y=2.6, which violates the constraint condition (FIG. 15A).

On the other hand, the counterexample 2 is not a counterexample since in the original prediction model, w1=0.7 and w2=1.4, resulting in y=2.1, which does not violate the constraint condition, that is, the counterexample 2 is a false counterexample (FIG. 15B). In this way, in the case of the false counterexample, it is determined that required verification accuracy for approximation is not achieved.

The inspection accuracy evaluation unit. 106 outputs, as a counterexample 1901 (FIG. 16A), the variable values obtained in the above search to the output device 205 (S312), and ends the processing.

The inspection accuracy evaluation unit 106 may specify a sub-expression satisfied by the counterexample, and output the sub-expression to the output device 205 via the test result output unit 107. An output example 1902 in this case is illustrated in FIG. 16B. By performing such processing, it is possible to contribute to modification of the prediction model by outputting a process of deriving an inference output value that violates the constraint condition in the prediction model.

The inspection accuracy evaluation unit 106 may relax the constraint condition based on the counterexample, and output the constraint condition by the output device 205 via the test result output unit 107. An output example 1903 in this case is illustrated in FIG. 16C. By performing such processing, it can be expected to output a constraint condition suitable for the prediction model, and to contribute to grasping characteristics of the prediction model.

Figure 17:
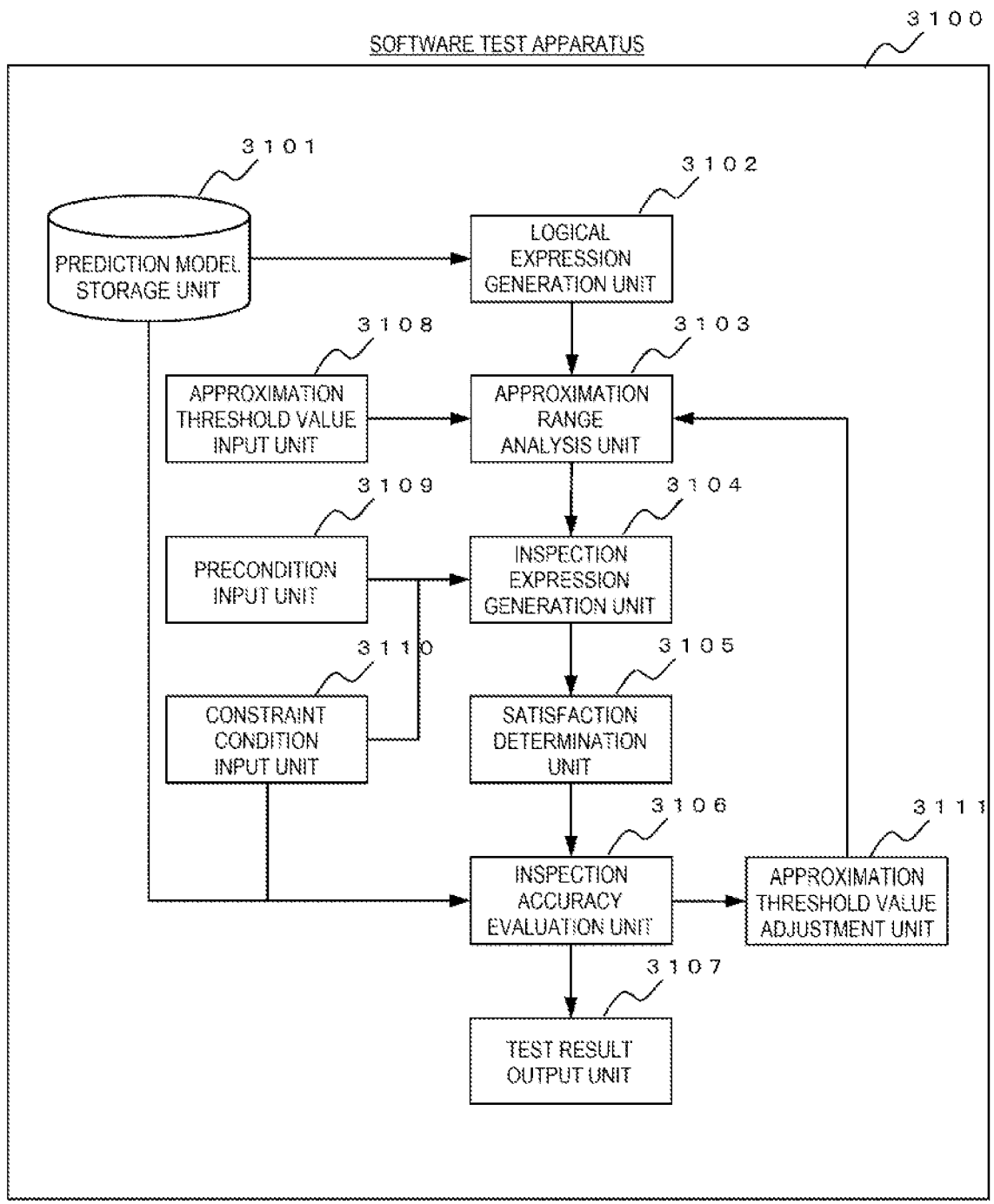
FIG. 17 is a diagram illustrating a functional configuration example of the software test apparatus according to the present embodiment.

The software test apparatus 100 may include an approximation threshold value adjustment unit 3111 (FIG. 17) for adjusting the approximation threshold value when the inspection accuracy evaluation unit 106 determines that the counterexample is a false counterexample as described above.

Figure 18:
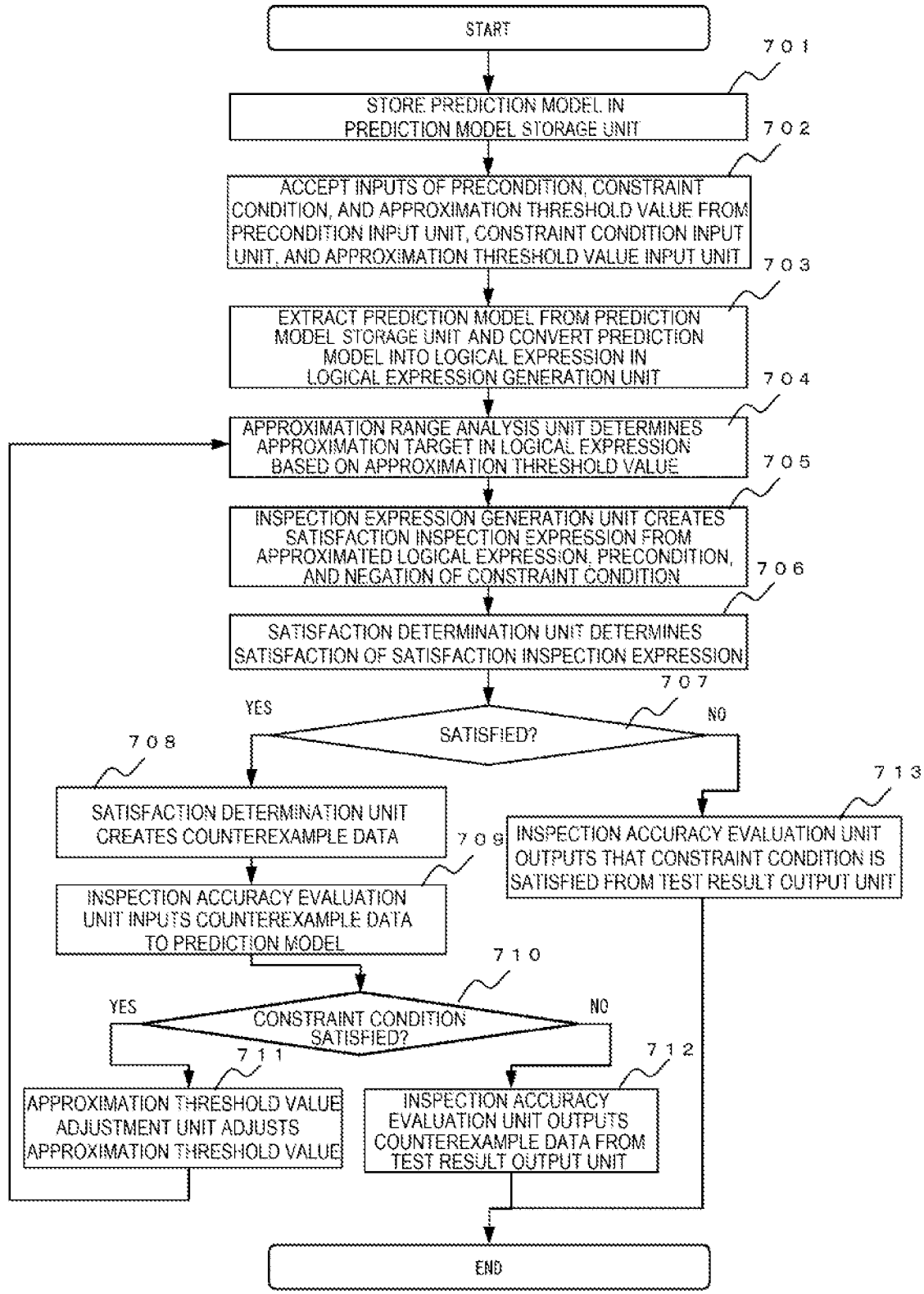

In a main flow in this case (FIG. 18), when it is determined that the counterexample data satisfies the constraint condition as a result of determination in step S710 (S710: Yes), the approximation threshold value adjustment unit 3111 sets the approximation threshold value to 0 and returns the processing to processing (S704) of the approximation range analysis unit, for example, when the counterexample detected as described above is not the counterexample 1 but the counterexample 2. With such an operation, when the false counterexample is detected, the approximation threshold value is adjusted to improve the inspection accuracy, and thus it is possible to always obtain a correct test result even starting from a rough approximation. As a result, improvement in test efficiency can be expected.

The software test apparatus 100 may delete a path that does not satisfy the precondition from the logical expression and efficiently perform subsequent processing. For example, when the precondition is f0<15 ∧f1>0.5, a logical expression 2001 in which paths including not (f0<30) that does not satisfy the precondition are deleted is illustrated in FIG. 19. By performing such an operation, the logical expression that does not satisfy the precondition is deleted (for example, see a decision tree 2 in FIG. 20) before the approximation range analysis and the satisfaction determination, and a calculation amount for extracting a case in which the inference output value of the prediction model violates the constraint condition can be reduced.

For example, the software test apparatus 100 may accept a fact that a maximum value of the weights given to leaf nodes of the "decision tree 2" is larger than the weights of leaf nodes of the "decision tree 1.", exclude the "decision tree 2" from the approximation target, and approximate a logical expression 2101 (FIG. 21) of the prediction model.

The software test apparatus 100 may configure a satisfaction inspection expression 2201 (FIG. 22) by arranging the logical expressions of the prediction model in descending order of the weights given to the leaf nodes. By performing such an operation, the satisfaction is determined from a logical expression having a large inference output value, and counterexample detection efficiency can be improved.

The software test apparatus 100 may perform control to change the approximation threshold value according to an input value range. When a precondition 2301 (FIG. 23A) and a constraint condition 2302 (FIG. 23B) in this case are assumed as illustrated in the drawings, the software test apparatus 100 divides the precondition into the following two preconditions (preconditions: f0<15 ∧f0>12 ∧f1>0.5, f0≤12 ∧f1>0.5), and sets an approximation threshold value (approximation threshold value: 0, approximation threshold value: 0.5) for each of the preconditions (FIGS. 23C and 23D).

By performing such an operation, it is possible to improve inspection accuracy for the input value range where there is a high possibility of presence of the counterexample, and to improve the test efficiency.

<In Case where Prediction Model is Neural Network>

As a form of the prediction model, a neural network as illustrated in FIG. 24 can be assumed, instead of the decision tree ensemble model. A neural network 2401 includes nodes divided into a plurality of layers including a first layer to a K-th layer.

Each node in the neural network 2401 outputs, to a node of a next layer, a value calculated by using "an output value of a node of a previous layer×a weight" as an input. The neural network 2401 in this case can be represented by a logical expression 2402.

Figure 25:
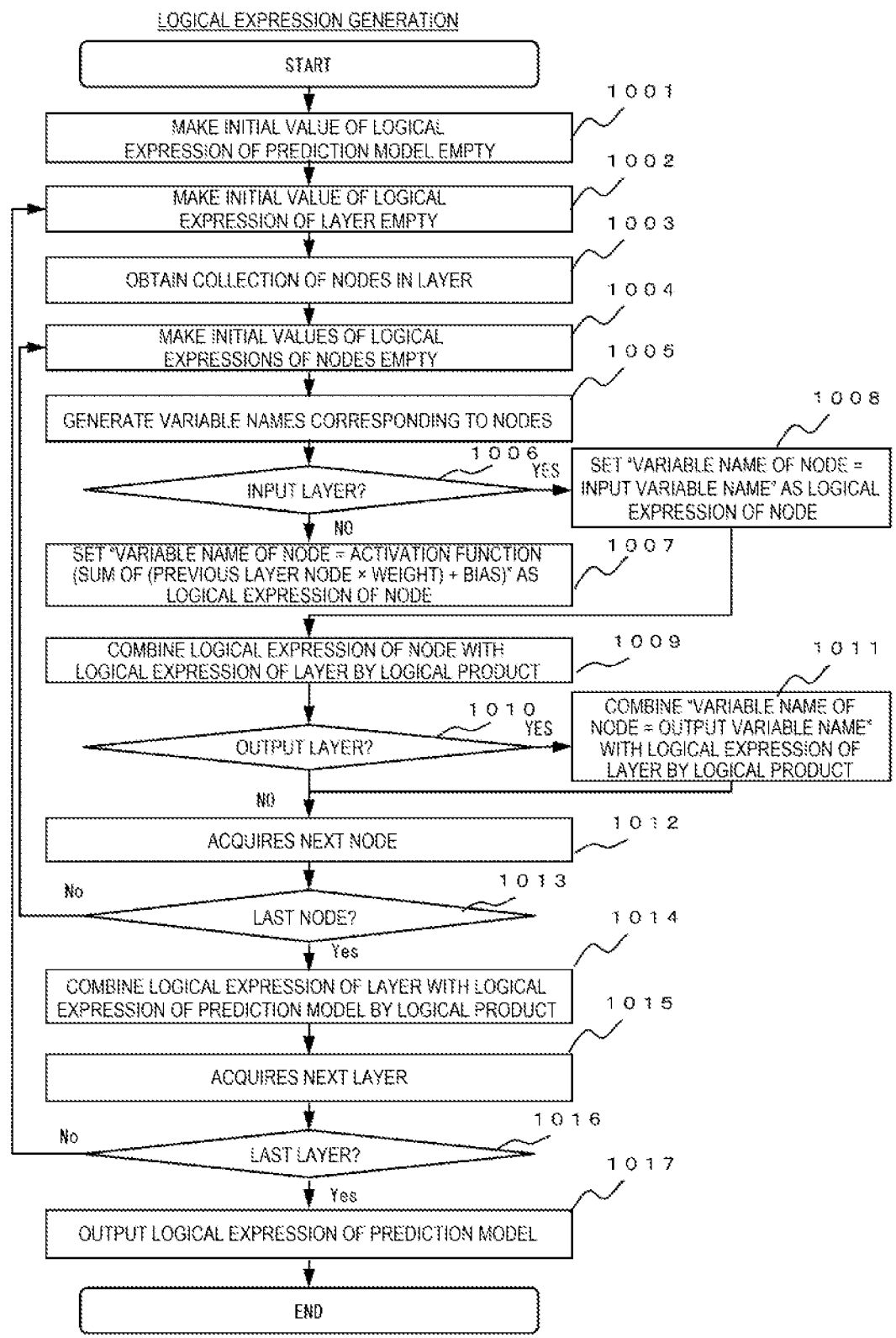
FIG. 25 is a flowchart illustrating a flow example of logical expression generation processing according to the present embodiment.

Here, processing of the logical expression generation unit 102 in the case where the prediction model is the neural network will be described with reference to FIG. 25. In this case, the logical expression generation unit 102 decomposes the neural network into nodes, and performs processing of combining an input/output relation by logical product. The logical expression 2402 obtained for the neural network 2401 has a configuration illustrated in FIG. 24.

Figure 26:
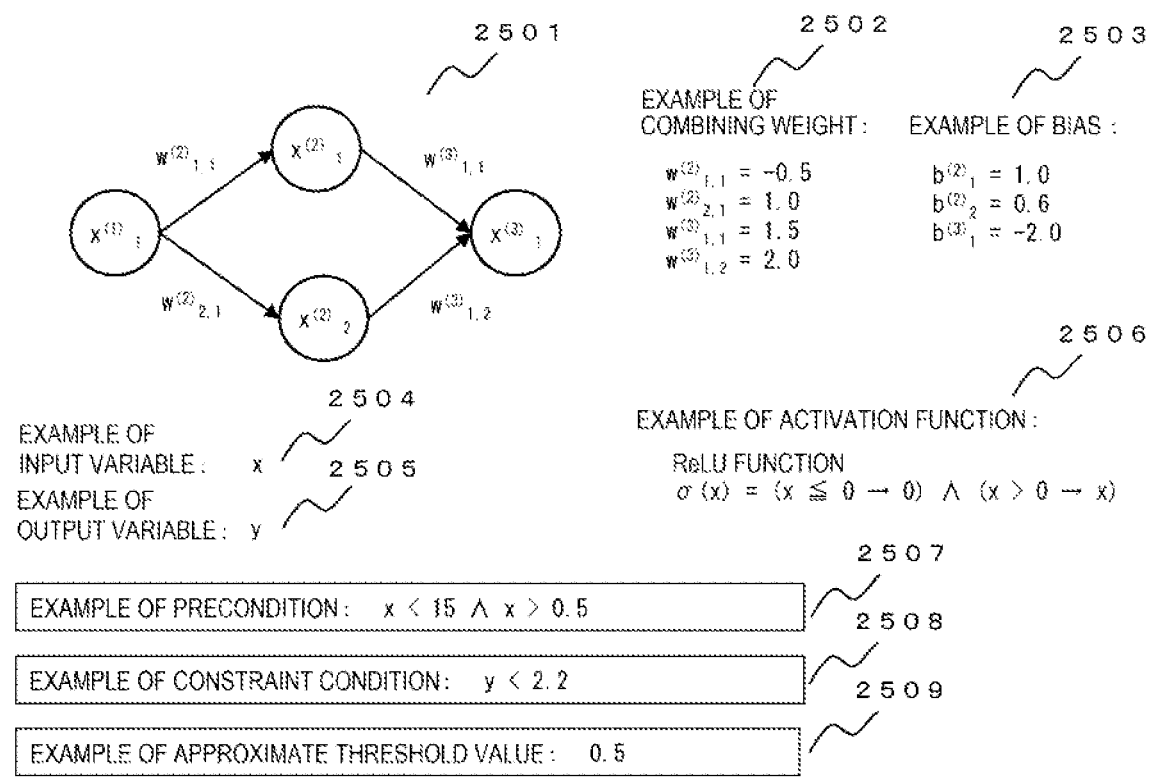
FIG. 26 is a diagram illustrating examples of the neural network, combining weights, biases, an input variable, an output variable, an activation function, a precondition, a constraint condition, and an approximation threshold value according to the second example.

A more simplified neural network 2501 is illustrated in FIG. 26. In this case, examples of combining weights 2502 between the nodes, examples of biases 2503, an example of an input variable 2504, an example of an output variable 2505, and an example of an activation function 2506 are also exemplified in FIG. 26. Further, examples of a precondition 2507, a constraint condition 2508, and an approximation threshold value 2509 are also illustrated.

In this case, the logical expression generation unit 102 makes an initial value of the logical expression of the prediction model empty (S1001).

The logical expression generation unit 102 makes an initial value of a logical expression of a layer empty (S1002).

Subsequently, the logical expression generation unit 102 obtains a collection of nodes in the layer (S1003).

The logical expression generation unit 102 makes initial values of logical expressions of the nodes empty (S1004).

Subsequently, the logical expression generation unit 102 generates variable names corresponding to the nodes (51005), and determines whether the nodes are an input layer (S1006).

When the nodes are an input layer as a result of the above determination (S1006: YES), the logical expression generation unit 102 sets "variable name of node=input variable name" as the logical expressions of the nodes (S1008).

On the other hand, when the nodes are not an input layer as a result of the above determination (S1006: NO), the logical expression generation unit 102 sets "variable name of node=activation function (sum of (previous layer node× weight)+bias)" as a logical expression 2601 (FIG. 27) of the nodes (S1007).

Subsequently, the logical expression generation unit 102 combines the logical expression 2601 (FIG. 27) of the nodes with a logical expression 2602 (FIG. 27) of the layer by logical product (S1009).

The logical expression generation unit 102 determines whether the layer is an output layer (S1010). When the layer is an output layer as a result of the determination (S1010: YES), the logical expression generation unit 102 combines "variable name of node=output variable name" with the logical expression of the layer by logical product (S1011).

On the other hand, when the layer is not the output layer as a result of the above determination (S1010: NO), the logical expression generation unit 102 acquires one unprocessed node among the nodes of the layer as a next node to be processed (S1012).

The logical expression generation unit 102 determines whether the node obtained here is a last unprocessed node among the nodes of the layer (S1013).

When the node is not the last node as a result of the above determination (S1013: NO), the logical expression generation unit 102 returns the processing to S1004.

On the other hand, when the node is the last node as a result of the above determination (S1013: YES), the logical expression generation unit 102 combines the logical expression of the layer with a logical expression 2603 (FIG. 27) of the prediction model by logical product (S1014).

Subsequently, the logical expression generation unit 102 may set one layer of the unprocessed layers as a next processing target (S1015).

The logical expression generation unit 102 determines whether the layer obtained in S1015 is a last unprocessed layer among the unprocessed layers in the neural network (S1016).

When the layer is not the last layer as a result of the above determination (S1016: NO), the logical expression generation unit 102 returns the processing to S1002.

On the other hand, when the layer is the last layer as a result of the above determination (S1016: YES), the logical expression generation unit 102 outputs the logical expression of the prediction model obtained up to here to the approximation range analysis unit 103 (S1.017), and ends the processing.

Figure 28:
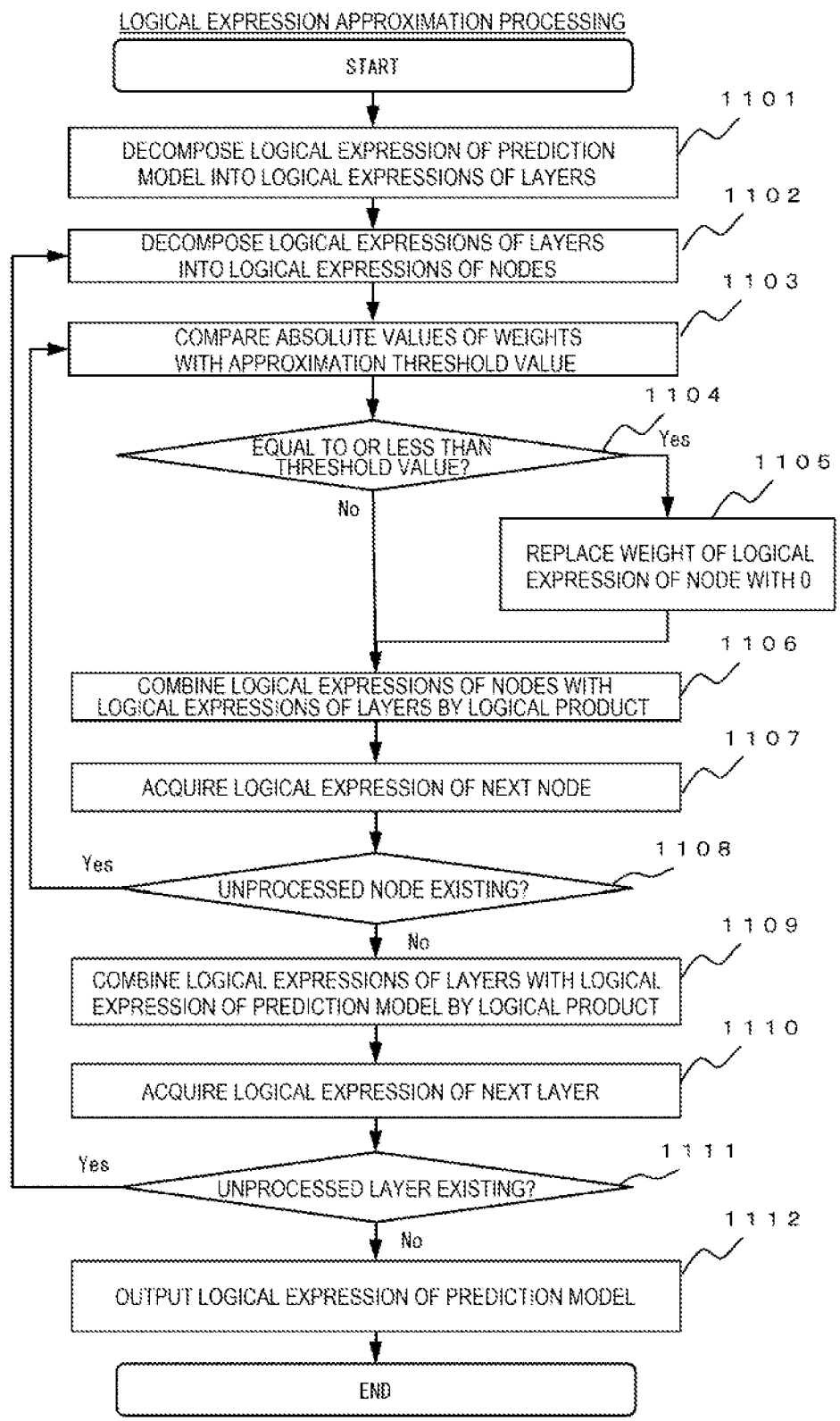
FIG. 28 is a flowchart illustrating a flow example of logical expression approximation processing according to the present embodiment.

Next, logical expression approximation processing in the case where the prediction model is the neural network will be described with reference to FIG. 28. In this case, the approximation range analysis unit 103 decomposes the logical expression of the prediction model into logical expressions of layers (S1101).

Subsequently, the approximation range analysis unit 103 decomposes the logical expressions of the layers into logical expressions of nodes (S1102).

The approximation range analysis unit 103 compares absolute values of the weights with the approximation threshold value (S1103). That is, a logical expression (a logical expression 2701 in FIG. 29) of a node whose absolute value of the combining weight is equal to or less than the approximation threshold value is extracted.

When the absolute value is determined to be equal to or less than the threshold value as a result of the above comparison (S1104: Yes), the approximation range analysis unit 103 replaces the weight of the logical expression of the node with 0 (S1105).

A logical expression 2702 obtained by the replacement is illustrated in FIG. 29.

On the other hand, when the absolute value is determined to be not equal to or less than the threshold value as a result of the above comparison (S1104: No), the approximation range analysis unit 103 combines the logical expressions of the nodes with the logical expressions of the layers by logical product (51106).

The approximation range analysis unit 103 acquires a logical expression of a next node (51107), and determines whether there is another unprocessed node (S1108).

When it is determined that there is an unprocessed node as a result of the above determination (S1108: Yes), the approximation range analysis unit 103 returns the processing to S1103.

On the other hand, when it is determined that there is no unprocessed node as a result of the above determination (S1108: No), the approximation range analysis unit 103 combines the logical expressions of the layers with the logical expression of the prediction model by logical product (S1109). A logical expression 2703 obtained here is illustrated in FIG. 29.

Subsequently, the approximation range analysis unit 103 acquires a logical expression of one layer of the unprocessed layers in the neural network as a next processing target (S1110), and determines whether there is another unprocessed layer (1111).

When there is an unprocessed layer as a result of the determination (S1111: Yes), the approximation range analysis unit 103 returns the processing to S1102. On the other hand, when there is no unprocessed layer as a result of the above determination (S1111: No), the approximation range analysis unit 103 outputs the logical expression of the prediction model, whose approximation processing is ended by the processing up to here, to the inspection expression generation unit 104 (S1112), and ends the processing.

The inspection expression generation unit 104 creates a logical expression 2801 (FIG. 30) in which the logical expression of the network, the precondition, and negation of the constraint condition are combined by logical product.

As already described with reference to FIG. 12, the satisfaction determination unit 105 searches for variable values (counterexamples) that satisfy the inspection expression. FIG. 31 illustrates counterexamples 2901 and 2902 obtained by such a search.

The inspection accuracy evaluation unit 106 determines that required verification accuracy for approximation is not achieved when there is no counterexample. On the other hand, when there is a counterexample, the inspection accuracy evaluation unit 106 inputs the counterexample into the prediction model and confirms that the counterexample is a true counterexample, as already described with respect to FIGS. 13 and 14.

Figure 32:
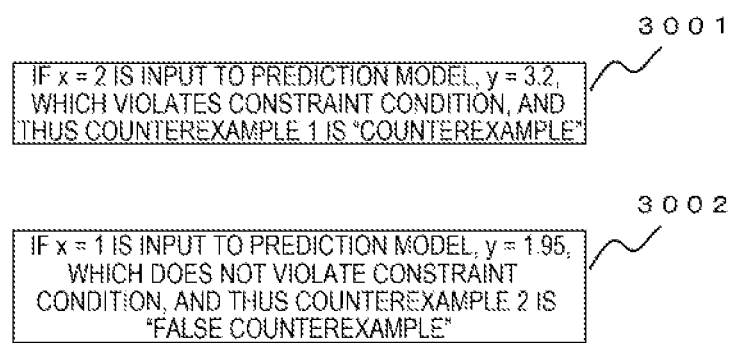
FIG. 32 is a diagram illustrating examples of authenticity determination of counterexamples according to the second example.

When the counterexample is a true counterexample, it is determined that the prediction model violates the constraint condition. In the example illustrated in FIG. 32, an output value of an original model of the counterexample 1 is that y=3.2, and the counterexample 1 is determined to be a true counterexample as indicated by 3001. When the counterexample is a false counterexample, it is determined that required verification accuracy for approximation is not achieved. In the example illustrated in FIG. 32, an output value of an original model of the counterexample 2 is that y=1.95, and the counterexample 2 is determined to be a false counterexample as indicated by 3002.

Although the invention has been described in detail based on a best embodiment, the invention is not limited to the embodiment, and various modifications can be made without departing from the scope of the invention.

According to the present embodiment, by simplifying the logical expression by a function of the approximation range analysis unit, the calculation amount for extracting the case in which the inference output value of the prediction model violates the constraint condition can be reduced, and a detection error accompanying the approximation can be eliminated by the inspection accuracy evaluation unit.

That is, the validity of the prediction model created by the machine learning can be verified with appropriate accuracy and efficiency.

At least the following is clarified by the description of the present specification. That is, in the software test apparatus according to the present embodiment, the arithmetic device may further execute processing of adjusting the approximation threshold value when the inspection accuracy related to the prediction model is insufficient.

In this way, when an erroneous extraction of a violation case is detected, the approximation threshold value is adjusted to improve the inspection accuracy, and thus it is possible to always obtain a correct test result even starting from the rough approximation, and the test efficiency is improved.

In the software test apparatus according to the present embodiment, the arithmetic device may further execute processing of confirming the counterexample when the counterexample exists in the evaluation of the inspection accuracy, and may output the counterexample when outputting the result.

In this way, by outputting, as the counterexample, an input value at which the inference output value violates the constraint condition, it is possible to contribute to the modification of the prediction model.

In the software test apparatus according to the present embodiment, the arithmetic device may further execute processing of specifying a sub-expression satisfied by the counterexample in the logical expression when the counterexample exists in the evaluation of the inspection accuracy, and output the specified sub-expression when outputting the result.

In this way, it is possible to contribute to the modification of the prediction model by outputting a process of deriving an inference output value that violates the constraint condition in the prediction model.

In the software test apparatus according to the present embodiment, the arithmetic device may further execute processing of relaxing the constraint condition based on the counterexample when the counterexample exists in the evaluation of the inspection accuracy, and output the relaxed constraint condition when outputting the result.

In this way, it is possible to contribute to grasping the characteristics of the prediction model by outputting the constraint condition suitable for the prediction model.

In the software test apparatus according to the present embodiment, the storage device may store a decision tree ensemble model as the prediction model, and the arithmetic device may decompose a decision tree of the decision tree ensemble model into paths to leaf nodes and convert the paths into logical expressions, in the conversion of the logical expression.

In this way, with respect to the decision tree ensemble model, the calculation amount for extracting the case in which the inference output value violates the constraint condition can be reduced, and the detection error accompanying the approximation can be eliminated by the inspection accuracy evaluation unit.

In the software test apparatus according to the present embodiment, the arithmetic device may delete a logical expression that does not satisfy the precondition, from the logical expressions converted from the paths to the leaf nodes in the conversion of the logical expression.

In this way, by deleting the logical expression that does not satisfy the precondition before the approximation range analysis and the satisfaction determination, the calculation amount for extracting the case in which the inference output value of the prediction model violates the constraint condition can be reduced.

In the software test apparatus according to the present embodiment, the arithmetic device may replace a logical expression converted from a decision tree in which a difference between a maximum value and a minimum value of weights given to the leaf nodes of the decision tree is equal to or less than the approximation threshold value with a constant, in the analysis of the approximation range.

In this way, when the counterexample does not exist for the logical expression, it is possible to guarantee that there is no case in which the prediction model violates the constraint condition, and it is possible to provide an approximation method that can guarantee that the prediction model violates the constraint condition even if only one true counterexample exists.

In the software test apparatus according to the present embodiment, the arithmetic device may exclude, from an approximation target at a given ratio, a decision tree in which the maximum value of the weights given to the leaf nodes is larger than that of another decision tree or the minimum value is smaller than that of another decision tree, in the analysis of the approximation range.

In this way, a decision tree having a large influence on the inference output value can be excluded from the approximation target.

In the software test apparatus according to the present embodiment, the arithmetic device may further execute processing of arranging the logical expressions, which are converted from the paths to the leaf nodes, in an order of weights given to the leaf nodes in the generation of the inspection expression.

In this way, the counterexample detection efficiency can be improved by performing the satisfaction determination in ascending or descending order of the inference output values.

In the software test apparatus according to the present embodiment, the storage device may hold, as the prediction model, a hierarchical neural network model including a deep neural network, and the arithmetic device may convert a combination relation between nodes of the hierarchical neural network model into a logical expression in the conversion of the logical expression.

In this way, with respect to the neural network model, the calculation amount for extracting the case in which the inference output value violates the constraint condition can be reduced, and the detection error accompanying the approximation can be eliminated by the inspection accuracy evaluation unit.

In the software test apparatus according to the present embodiment, the arithmetic device may delete an internode combination having a combining weight equal to or less than the approximation threshold value in the analysis of the approximation range.

In this way, it is possible to provide an approximation method that can guarantee that the prediction model violates the constraint condition even if only one true counterexample exists.

In the software test method according to the present embodiment, processing of adjusting the approximation threshold value may be further executed by the information processing device when the inspection accuracy related to the prediction model is insufficient.

What is claimed is:

1. A software test method to be executed by an information processing device, the method comprising:
    processing of storing, in a storage device, a prediction model generated by machine learning, the prediction model being a test target;
    processing of accepting an input of a precondition for determining a range of a test input value;
    processing of accepting an input of a constraint condition for an inference output value of a prediction model with respect to the test input value;
    processing of accepting an input of an approximation threshold value;
    processing of acquiring the prediction model from the storage device and converting the prediction model into a logical expression;
    processing of analyzing an approximation range based on the approximation threshold value with respect to the logical expression to simplify the logical expression;
    processing of generating an inspection expression by combining the simplified logical expression with the precondition and negation of the constraint condition;
    processing of searching for, as a counterexample, a value satisfying the inspection expression;
    processing of inputting the value to the prediction model to evaluate inspection accuracy when the counterexample exists; and
    processing of outputting a result of the evaluation.

2. The software test method according to claim 1, further comprising:
    processing of adjusting the approximation threshold value by the information processing device when the inspection accuracy related to the prediction model is insufficient.

3. A software test apparatus, comprising:
    a storage device configured to store a prediction model generated by machine learning, the prediction model being a test target; and
    an arithmetic device configured to execute
        processing of accepting an input of a precondition for determining a range of a test input value,
        processing of accepting an input of a constraint condition for an inference output value of a prediction model with respect to the test input value,
        processing of accepting an input of an approximation threshold value,
        processing of acquiring the prediction model from the storage device and converting the prediction model into a logical expression,
        processing of analyzing an approximation range based on the approximation threshold value with respect to the logical expression to simplify the logical expression,
        processing of generating an inspection expression by combining the simplified logical expression with the precondition and negation of the constraint condition,
        processing of searching for, as a counterexample, a value satisfying the inspection expression,
        processing of inputting the value to the prediction model to evaluate inspection accuracy when the counterexample exists, and
        processing of outputting a result of the evaluation.

4. The software test apparatus according to claim 3, wherein
    the arithmetic device is configured to further execute processing of adjusting the approximation threshold value when the inspection accuracy related to the prediction model is insufficient.

5. The software test apparatus according to claim 3, wherein
    the arithmetic device is configured to further execute processing of confirming the counterexample when the counterexample exists in the evaluation of the inspection accuracy, and output the counterexample when outputting the result.

6. The software test apparatus according to claim 3, wherein
    the arithmetic device is configured to further execute processing of specifying a sub-expression satisfied by the counterexample in the logical expression when the counterexample exists in the evaluation of the inspection accuracy, and output the specified sub-expression when outputting the result.

7. The software test apparatus according to claim 3, wherein
    the arithmetic device is configured to
    further execute processing of relaxing the constraint condition based on the counterexample when the counterexample exists in the evaluation of the inspection accuracy, and output the relaxed constraint condition when outputting the result.

8. The software test apparatus according to claim 3, wherein
    the storage device is configured to
    hold a decision tree ensemble model as the prediction model, and
    the arithmetic device is configured to
    decompose a decision tree of the decision tree ensemble model into paths to leaf nodes and convert the paths into logical expressions, in the conversion of the logical expression.

9. The software test apparatus according to claim 8, wherein
the arithmetic device is configured to
delete a logical expression that does not satisfy the precondition from the logical expressions converted from the paths to the leaf nodes, in the conversion of the logical expression.

10. The software test apparatus according to claim 8, wherein
the arithmetic device is configured to
replace a logical expression converted from a decision tree in which a difference between a maximum value and a minimum value of weights given to the leaf nodes of the decision tree is equal to or less than the approximation threshold value with a constant, in the analysis of the approximation range.

11. The software test apparatus according to claim 10, wherein
the arithmetic device is configured to
exclude, from an approximation target at a given ratio, a decision tree in which the maximum value of the weights given to the leaf nodes is larger than that of another decision tree or the minimum value is smaller than that of another decision tree, in the analysis of the approximation range.

12. The software test apparatus according to claim 8, wherein
the arithmetic device is configured to
further execute processing of arranging the logical expressions, which are converted from the paths to the leaf nodes, in an order of weights given to the leaf nodes, in generation of the inspection expression.

13. The software test apparatus according to claim 3, wherein
the storage device is configured to
hold, as the prediction model, a hierarchical neural network model including a deep neural network, and
the arithmetic device is configured to
convert a combination relation between nodes of the hierarchical neural network model into a logical expression in the conversion of the logical expression.

14. The software test apparatus according to claim 13, wherein
the arithmetic device is configured to
delete an internode combination having a combining weight equal to or less than the approximation threshold value in the analysis of the approximation range.

* * * * *